US012142235B2

(12) United States Patent
Wu et al.

(10) Patent No.: US 12,142,235 B2
(45) Date of Patent: Nov. 12, 2024

(54) APPARATUS AND SYSTEM USING ACTIVE-MATRIX ELECTROWETTING-ON-DIELECTRIC (AM-EWOD)

(71) Applicant: CYTESI, INC., Menlo Park, CA (US)

(72) Inventors: Tung-Yu Wu, Hsinchu (TW); Chung-Yi Wang, Zhubei (TW); Tang-Hung Po, Zhubei (TW)

(73) Assignee: CYTESI INC., Menlo Park, CA (US)

( * ) Notice: Subject to any disclaimer, the term of this patent is extended or adjusted under 35 U.S.C. 154(b) by 0 days.

(21) Appl. No.: 18/377,614

(22) Filed: Oct. 6, 2023

(65) Prior Publication Data

US 2024/0169944 A1 May 23, 2024

Related U.S. Application Data

(63) Continuation of application No. 18/224,694, filed on Jul. 21, 2023, now Pat. No. 12,073,802.

(60) Provisional application No. 63/426,363, filed on Nov. 17, 2022.

(51) Int. Cl.
*G09G 3/34* (2006.01)
*B01L 3/00* (2006.01)

(52) U.S. Cl.
CPC ........ *G09G 3/348* (2013.01); *B01L 3/502715* (2013.01); *B01L 3/502792* (2013.01); *B01L 2300/0645* (2013.01); *B01L 2400/0427* (2013.01); *G09G 2300/0842* (2013.01); *G09G 2300/0871* (2013.01)

(58) Field of Classification Search
CPC .... G02B 26/004; G02B 26/005; G09G 3/348; G09G 3/3433–3446; G09G 2300/0842; G09G 2300/0871
See application file for complete search history.

(56) References Cited

U.S. PATENT DOCUMENTS

| | | | | |
|---|---|---|---|---|
| 2009/0128585 A1* | 5/2009 | Shimodaira | G09G 3/344 | 345/107 |
| 2015/0206478 A1* | 7/2015 | Yamazaki | G09G 3/344 | 345/206 |
| 2016/0372054 A1* | 12/2016 | Yamazaki | G09G 3/344 | |
| 2019/0385541 A1* | 12/2019 | Chen | G02F 1/1676 | |

* cited by examiner

*Primary Examiner* — Hang Lin
(74) *Attorney, Agent, or Firm* — Juan Carlos A. Marquez; Marquez IP Law Office, PLLC

(57) ABSTRACT

An apparatus including a pixel electrode circuit is provided. The pixel electrode circuit includes a first switch, a second switch, a first-type transistor, a first second-type transistor, and a second second-type transistor. The first switch and the second switch are respectively controlled by a first control signal and a second control signal. The first-type transistor includes a gate electrically connected to a first node, a first terminal connected to a first power supply voltage, and a second terminal connected to a third node. The first second-type transistor includes a gate electrically connected to a second node, a first terminal connected to a second power supply voltage, and a second terminal connected to the third node. The second second-type transistor includes a gate electrically connected to the second node, a first terminal being grounded, and a second terminal providing an output voltage.

18 Claims, 24 Drawing Sheets

APPARATUS AND SYSTEM USING ACTIVE-MATRIX ELECTROWETTING-ON-DIELECTRIC (AM-EWOD)

CROSS-REFERENCE TO RELATED APPLICATIONS

This application claims the benefit of U.S. application Ser. No. 18/224,694, filed Jul. 21, 2023 and entitled "Apparatus and System Using Active-matrix Electrowetting-on-dielectric (AM-EWOD)", which claims the benefit of U.S. Provisional Application No. 63/426,363, filed Nov. 17, 2022, the entire disclosure of which are incorporated by reference herein.

BACKGROUND

Technical Field

The present disclosure relates to electrowetting-on-dielectric (EWOD) systems, and, in particular, to an apparatus and a system using active-matrix electrowetting-on-dielectric (AM-EWOD).

Description of the Related Art

Microfluidics provide liquid management based on droplets. The droplets on the chip serve to transport a variety of reaction materials, including biochemical reagents, cells, proteins, DNA, and RNA. Microfluidics allow software-reconfigurable operations on individual droplets, such as movement, combination, splitting, and dispensation from reservoirs by manipulating Pico liter to Nano liter scale droplets in electric fields. A variety of experiments are accommodated by modular functional components (temperature control, magnetic attraction, fluorescence detection, etc.). Control in microfluidics is based on the principle of Electrowetting on Dielectric (EWOD), in which, when there is liquid on the electrode, and a potential is applied to the electrode, the wettability of the solid-liquid interface at the corresponding position of the electrode can be changed, and the contact angle of the droplet-electrode interface changes accordingly. If there is a potential difference between the electrodes in the droplet area, a lateral driving force will be generated because of the contact angle difference, causing the droplet to move laterally on the electrode substrate.

The electrodes and drivers in conventional digital microfluidics are simply connected passively. The number of wires and connection pads limit scalability accordingly, while the number of electrodes limits the application. Conventional technology can only generate/manipulate low-resolution droplets and is insufficient for single-cell applications.

SUMMARY

One aspect of the present disclosure provides an apparatus including a pixel electrode circuit. The pixel electrode circuit includes a first switch, a second switch, a first-type transistor, a first second-type transistor, and a second second-type transistor. The first switch and the second switch are respectively controlled by a first control signal and a second control signal. The first switch comprises a first terminal electrically connected to a first voltage, and a second terminal electrically connected to a first node. The second switch has a first terminal electrically connected to a second voltage, and a second terminal electrically connected to a second node. The first-type transistor includes a gate electrically connected to the first node, a first terminal connected to a first power supply voltage, and a second terminal connected to a third node. The first second-type transistor includes a gate electrically connected to the second node, a first terminal connected to a second power supply voltage, and a second terminal connected to the third node. The second second-type transistor includes a gate electrically connected to the second node, a first terminal being grounded, and a second terminal providing an output voltage.

Another aspect of the present disclosure provides a system including a top plate electrode, a dielectric layer, and a plurality of pixel electrode circuits. A droplet is disposed between the top plate electrode and the dielectric layer. Each of the plurality of pixel electrode circuits includes a first switch, a second switch, a first-type transistor, a first second-type transistor, a second second-type transistor, and a first capacitor. The first switch is controlled by a first control voltage, and includes a first terminal electrically connected to a first voltage and a second terminal electrically connected to a first node. The second switch is controlled by a second control voltage, and it includes a first terminal electrically connected to a second voltage, and a second terminal electrically connected to a second node. The first-type transistor includes a gate electrically connected to the first node, a first terminal connected to a first power supply voltage, and a second terminal connected to a third node. The first second-type transistor includes a gate electrically connected to the second node, a first terminal connected to a second power supply voltage, and a second terminal connected to the third node. The second second-type transistor includes a gate electrically connected to the second node, a first terminal being grounded, and a second terminal providing an output voltage. The first capacitor is coupled between the first node and the second node.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
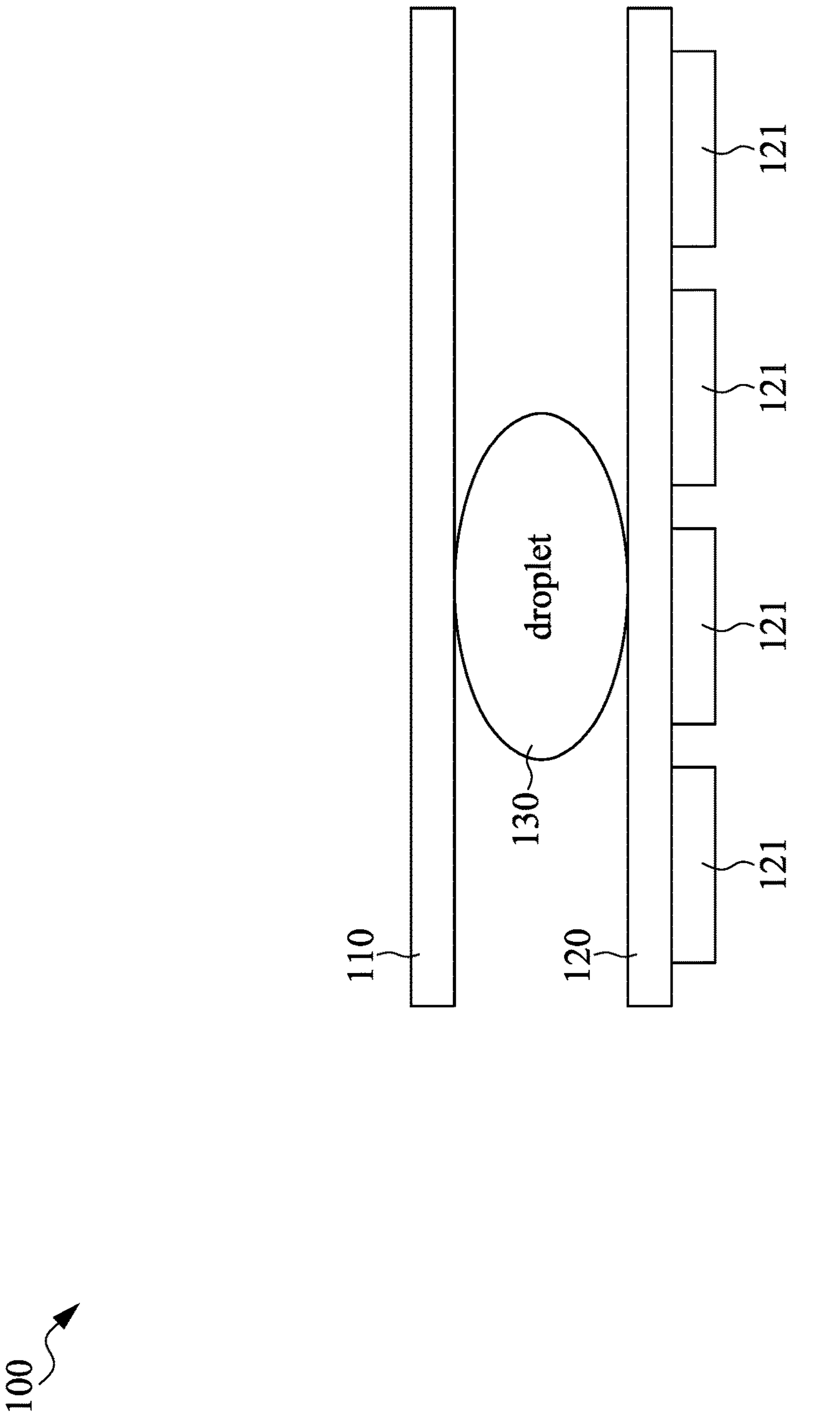
FIG. 1A is a cross-section of an active-matrix electrowetting on dielectric (AM-EWOD) system 100 in accordance with an embodiment of the present disclosure.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

It should be noted that the structures, proportions, sizes, etc. shown in the drawings of the specification are only used to match the content recorded in the specification for the understanding and reading of those skilled in the art, and are not used to limit the implementation of this application, so it has no technical substantive meaning. Any modification of structure, change of proportional relationship or adjustment of size, without affecting the effect and purpose of this application, should still fall within the scope of this application. The disclosed technical content must be within the scope covered. At the same time, terms such as "above", "first", "second" and "one" quoted in this specification are only for the convenience of description and are not used to limit the scope of implementation of this application. The change or adjustment of the relative relationship shall also be regarded as the implementable scope of the present application without substantive change in the technical content.

Figure 1B:
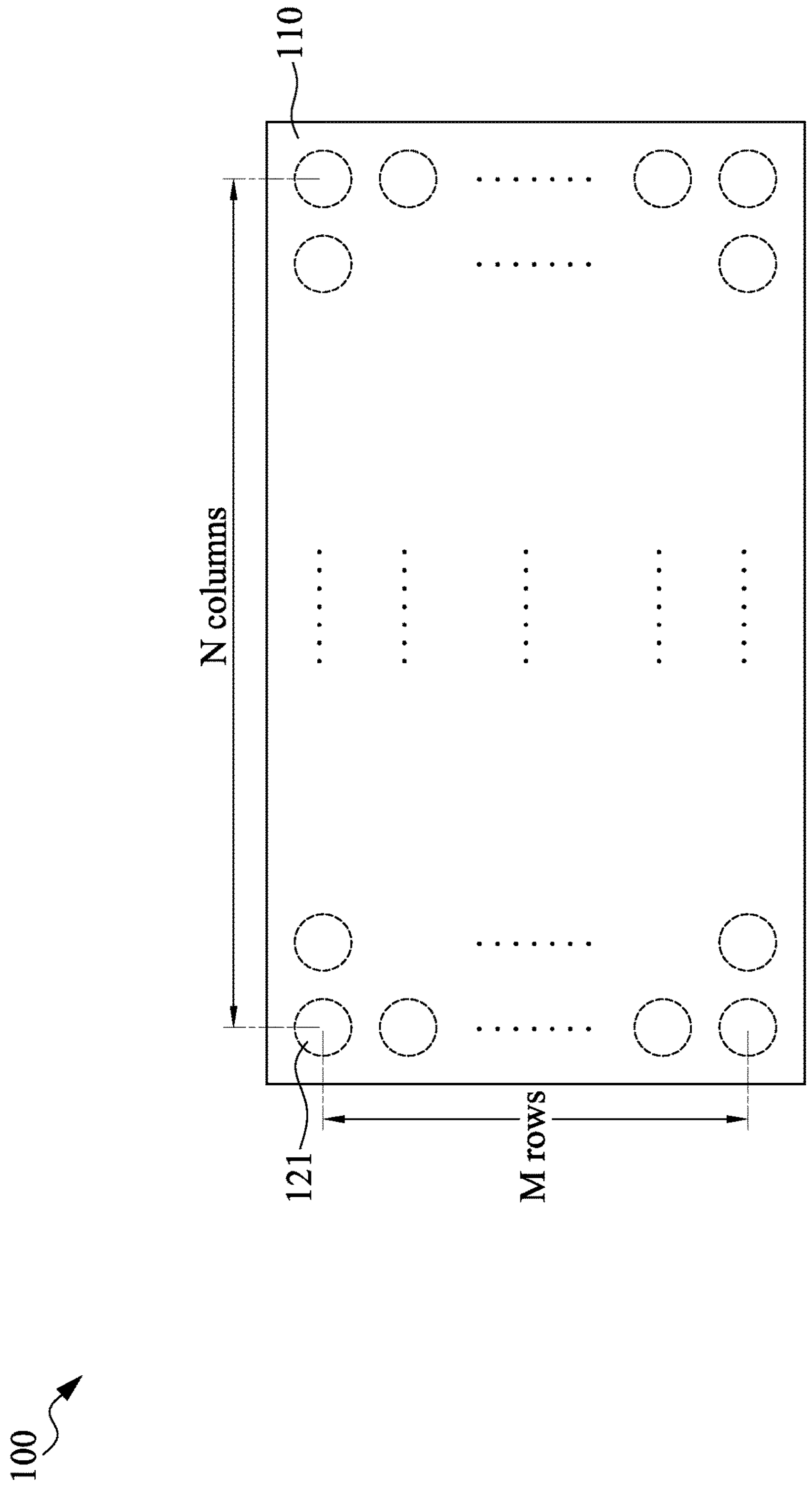
FIG. 1B is a top view of the AM-EWOD system 100 of FIG. 1A.

It should also be noted that the longitudinal section corresponding to the embodiments of the present application can correspond to the front view, the transverse section can correspond to the right view, and the horizontal section can correspond to the top view FIG. 1A is a cross-section of an active-matrix electrowetting on dielectric (AM-EWOD) system 100 in accordance with an embodiment of the present disclosure. FIG. 1B is a top view of the AM-EWOD system 100 in FIG. 1A.

Referring to FIGS. 1A and 1B, in an embodiment, the AM-EWOD system 100 may include a top plate electrode 110, a dielectric layer 120, and one or more droplets 130, as shown in FIG. 1A. The one or more droplets 130 may be disposed between the top plate electrode 110 and the dielectric layer 120. A plurality of pixel electrodes 121 may be disposed on a bottom surface of the dielectric layer 120 opposing to the droplets 130. The pixel electrodes 121 may be arranged in a two-dimensional array, such as M rows×N columns, as shown in FIG. 1B.

An alternating-current (AC) voltage signal VAC may be applied to the top plate electrode 110. The alternating-current (AC) voltage signal VAC may have a predetermined voltage swing range. In one embodiment, when the pixel electrode 121 is grounded, and thus activated. Thus, the voltage of the dielectric layer 120 is pulled to the ground. There is a voltage difference between the top plate electrode 110 and the dielectric layer 120. The voltage difference will change the contact angle of the droplet 130. The movement of the droplet 130 can be controlled accordingly.

In one embodiment, when the pixel electrodes 121 the output terminals of the pixel electrodes 121 are floating, and thus are not activated. The dielectric layer 120 will be electrically coupled with the top plate electrode 110 due to the coupling capacitance of the droplet 130. In other words, the voltage level of the dielectric layer 120 may follow the AC voltage signal VAC, and there is no voltage difference between the top plate electrode 110 and the dielectric layer 120. Therefore, the droplet 130 will not be moved.

Figure 2:
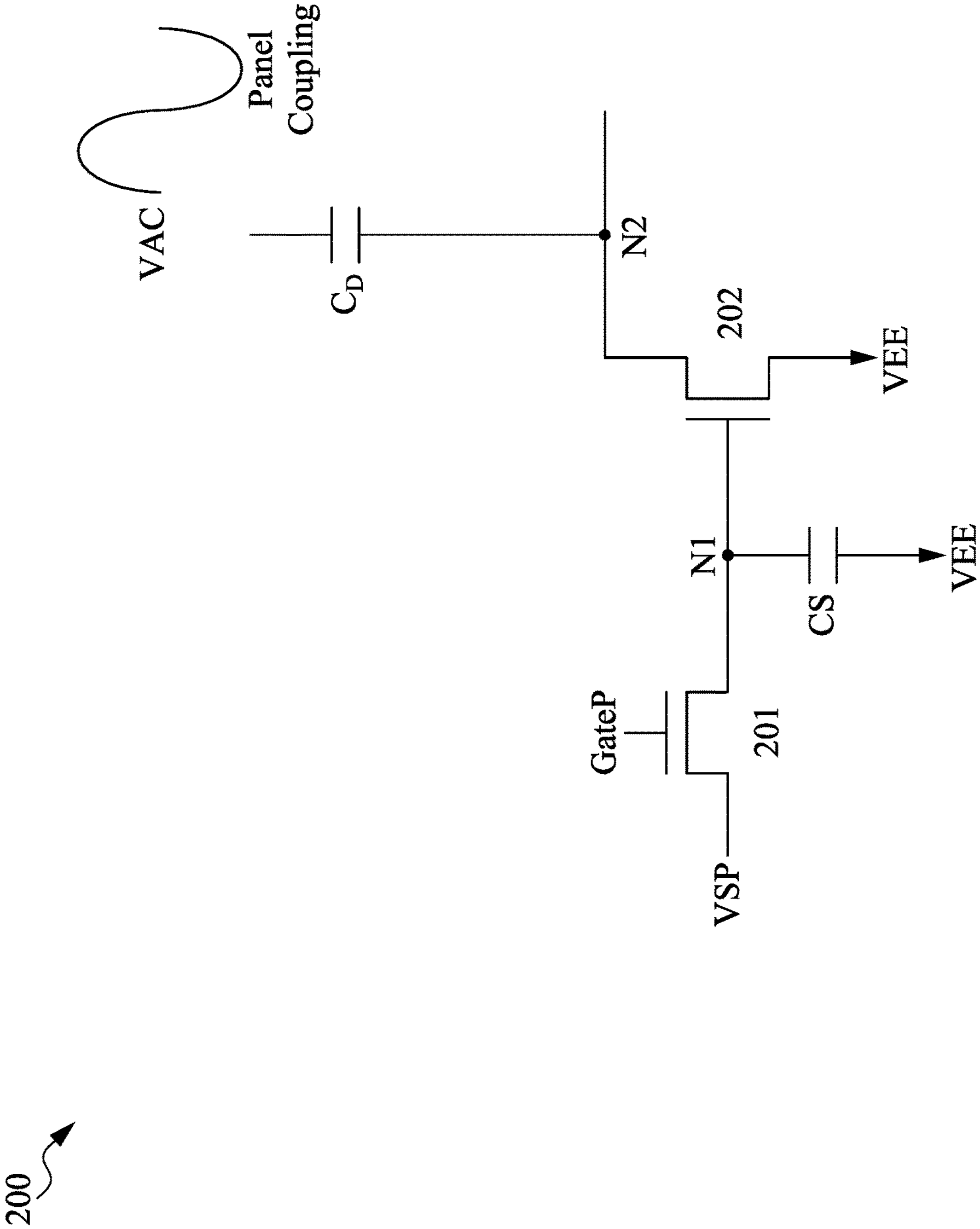
FIG. 2 is a schematic diagram of a pixel electrode circuit 200 in accordance with an embodiment of the present disclosure.

FIG. 2 is a schematic diagram of a pixel electrode circuit 200 in accordance with an embodiment of the present disclosure. Please refer to FIG. 1 and FIG. 2.

The pixel electrode circuit 200 in FIG. 2 may be an example of the pixel electrode 121 in FIG. 1. The pixel electrode circuit 200 may be implemented using a 2T1C (i.e., 2 transistors plus 1 capacitor) circuit which may include a first transistor 201 and a second transistor 202.

The first transistor 201 may be a switch controlled by a control signal GateP. A first terminal of the first transistor 201 is coupled to an input voltage VSP (i.e., a DC voltage). A second terminal of the first transistor 201 is coupled to node N1. The second transistor 202 may have a gate coupled to node N1, a drain being an output terminal, and a source being grounded. In some embodiment, a capacitor CS is coupled between node N1 and the ground.

The first transistor 201 is a first type transistor, and the second transistor 202 is a second type transistor. In one embodiment, the first transistor 201 may be P-type transistor, and the second transistor 202 may be N-type transistor. In some embodiments, the first transistor 201 may be PMOS transistor, and the second transistor 202 may be NMOS transistor.

In an exemplary description of the operations of the pixel electrode circuit 200 in FIG. 2, it is assumed that the control signal GateP is in a high-logic state, indicating that the first transistor 201 is turned on. When the input voltage VSP is in the high-logic state, the input voltage VSP may pass through the first transistor 201. Thus, node N1 may be charged to the input voltage VSP. At this time, the second transistor 202 is turned on, and the voltage Vtop at the output terminal (i.e., node N2) of the second transistor 202 is pulled down to the ground (e.g., VSS or 0V). When the input voltage VSP is in the low-logic state, the input voltage VSP may reach node N1 through the first transistor 201, and thus the voltage level at node N1 is also charged to the input voltage VSP. At this time, the second transistor 202 is turned off, and the output terminal (i.e., node N2) of the second transistor 202 is floating. Therefore, the voltage Vtop at the output terminal of the second transistor 202 may follow the AC voltage signal VAC on the top plate electrode 110 through the coupling capacitance $C_D$ of the droplet 130.

With respect to the pixel electrode circuit 200 shown in FIG. 2, a very high voltage (i.e., a positive voltage VCC) is needed to turn the second transistor 202 on and off. Otherwise, the second transistor 202 will not function as expected. For example, the second transistor 202 can be fully turned off when the input voltage VSP is at a very low voltage (i.e., a negative voltage VEE), so the output terminal (i.e., node N2) of the second transistor 202 is floating at this time. It should be noted that since a very low voltage is used for the input voltage VSP, a very high voltage is also used for the input voltage VSP for switching as well. Thus, the first transistor 201 may suffer the stress of a very high voltage swing between voltages VCC and VEE, and it may cause failure of the voltage stress test for the first transistor 201.

In the embodiment of FIG. 2, a very wide voltage swing range is required to turn on and turn off the second transistor 202. For example, a very low voltage is applied to the second transistor 202 to ensure that the second transistor 202 is fully turned-off while the voltage Vtop is floating. In this case, the first transistor 201 should be provided a very wide voltage swing range of the input voltage VSP. However, such conditions will cause a failure of the voltage stress test for the first transistor 201. Therefore, a modify design is provided in the embodiment of FIG. 3

Figure 3:
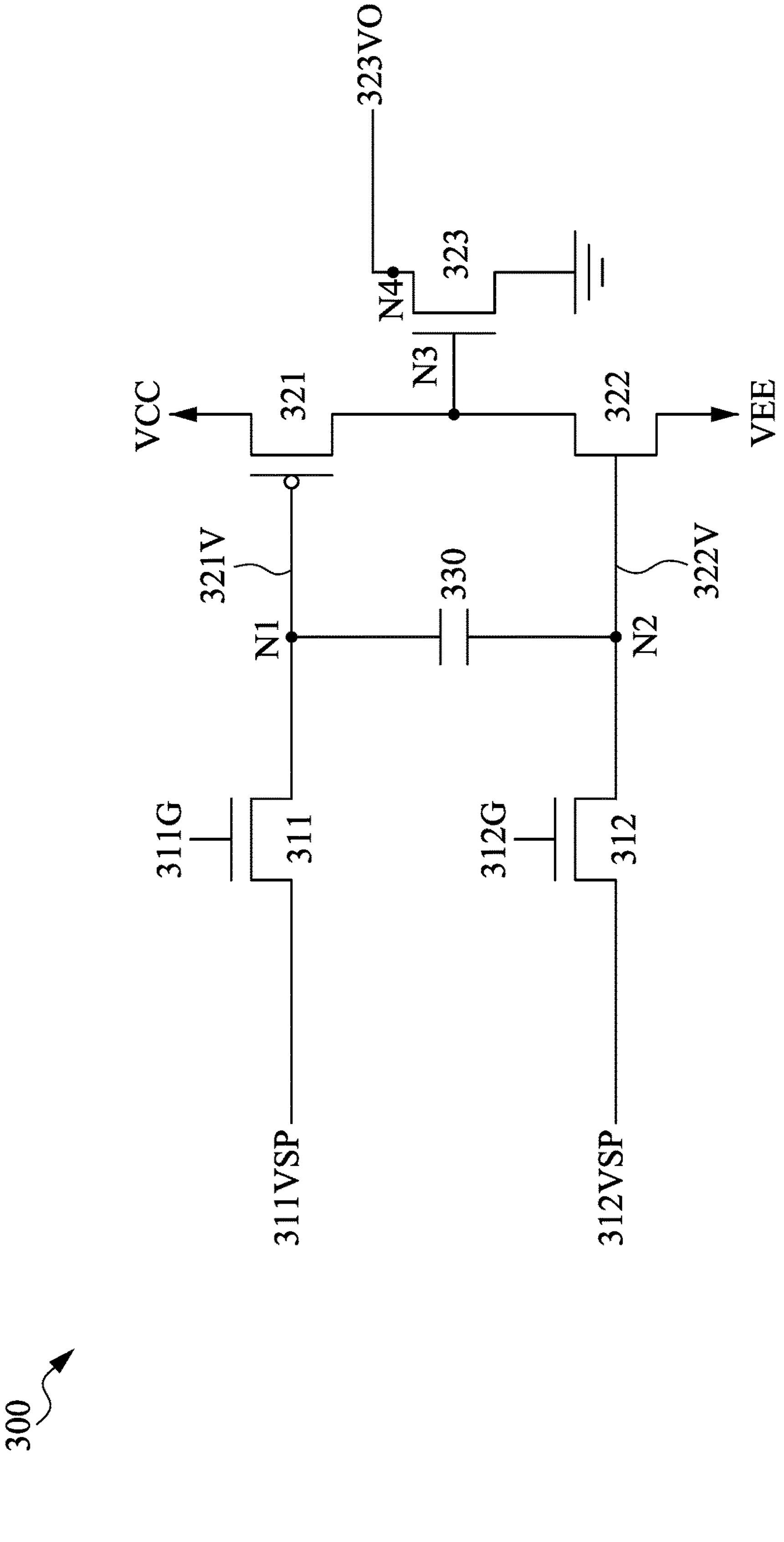
FIG. 3 is a schematic diagram of a pixel electrode circuit 300 in accordance with another embodiment of the present disclosure.

FIG. 3 is a schematic diagram of a pixel electrode circuit 300 in accordance with another embodiment of the present disclosure.

In another embodiment, the pixel electrode circuit 300 shown in FIG. 3 may be implemented using a 5T1C (i.e., 5 transistors plus 1 capacitor) circuit, which is modified from pixel electrode circuit 200 shown in FIG. 2. For example, the pixel electrode circuit 300 shown in FIG. 3 may include a transistor 311, a transistor 312, and transistors 321, 322, and 323.

In some embodiments, the transistor 311 and the transistor 312 may be implemented using N-type transistors. The transistor 321 may be a P-type transistor, and the transistors 322 and 323 may be N-type transistors. The present disclosure is not limited thereto.

The transistor 311 may be controlled by control signal 311G. The transistor 322 may be controlled by control signal 312G. The transistor 311 may have a first terminal coupled to the input voltage 311VSP, and a second terminal coupled to node N1. The transistor 312 may have a first terminal coupled to the input voltage 312VSP, and a second terminal coupled to node N2. In some embodiments, a capacitor 330 may be coupled between nodes N1 and N2. The transistor 321 may have a gate coupled to node N1, a terminal (such as a source) coupled to the positive power supply voltage VCC, and a further terminal (such as a drain) coupled to node N3. The transistor 322 may have a gate coupled to node N2, a terminal (such as a source) coupled to the negative power supply voltage VEE, and a further terminal (such as a drain) coupled to node N3. The transistor 323 may have a gate coupled to node N3, a terminal (such as a source) being grounded, and a further terminal (such as a drain) being an output terminal (i.e., node N4) providing a voltage 323VO.

As shown in FIG. 3, the input voltage 311VSP is a relatively high voltage (i.e., a positive voltage), and the input voltage 312VSP is a relatively low voltage (i.e., a negative voltage). Given that the control signals 311G and 312G are in the high-logic state, the transistor 311 and the transistor 312 are turned on, so the input voltage 311VSP may reach node N1 through the transistor 311, and the input voltage 312VSP may reach node N2 through the transistor 312. The transistor 311 provides an input voltage 321V to the transistor 321 through node N1. The transistor 322 provides an input voltage 322V to the transistor 322 through node N2.

Given that the positive power supply voltage VCC is equal to +Vcc and the negative power supply voltage VEE is equal to −Vee, the voltage swing range at node N1 in FIG. 3 may be between +Vcc and −Vee.

Referring to FIG. 2, if the pixel electrode circuit 200 shown in FIG. 2 is used, the first transistor 201 may have a wider voltage swing range between (+Vcc+Vth1) and (−Vee−Vth2), wherein Vth1 and Vth2 denote the threshold voltages of the transistors 201 and 202, respectively. Thus, the voltage difference between the highest voltage and the lowest voltage in the voltage swing range of the first transistor 201 in FIG. 2 is Vcc+Vee+Vth1+Vth2.

Referring back to FIG. 3, if the pixel electrode circuit 300 shown in FIG. 3 is used, the voltage swing range at node N1 (i.e., transferring the input voltage 321V) may be between +Vcc and 0V. The voltage swing range of the transistor 311 may be between (+Vcc+Vth1) and −Vth2, wherein Vth1 denotes the threshold voltage of the transistor 321, and Vth2 denotes the threshold voltage of the transistors 311, 312, and 322. Thus, the voltage difference between the highest voltage and the lowest voltage in the voltage swing range of the transistor 311 in FIG. 3 is Vcc+Vth1+Vth2. In comparison with FIG. 2, the voltage swing range at node N1 transferring the input voltage 321V in FIG. 3 may be reduced from (Vcc+Vee+Vth1+Vth2) to (Vcc+Vth1+Vth2).

Similarly, the voltage swing range at node N2 may be between −Vee and (−Vee+Vref), wherein the reference voltage Vref may indicate a predetermined voltage to turn the transistor MN1 on and off. Thus, the voltage swing range for the transistor 312 may be between (−Vee−Vth1) and (−Vee+Vref+Vth2). In comparison with the pixel electrode circuit 200 in FIG. 2, the voltage swing range of the transistor 312 in FIG. 3 can be reduced from (Vref+Vee+Vth1+Vth2) to (Vref+Vth1+Vth2). Accordingly, the design of the pixel electrode circuit 300 in FIG. 3 can effectively reduce the voltage swing range of transistors, thereby increasing the probability of passing the voltage stress test.

Figure 4:
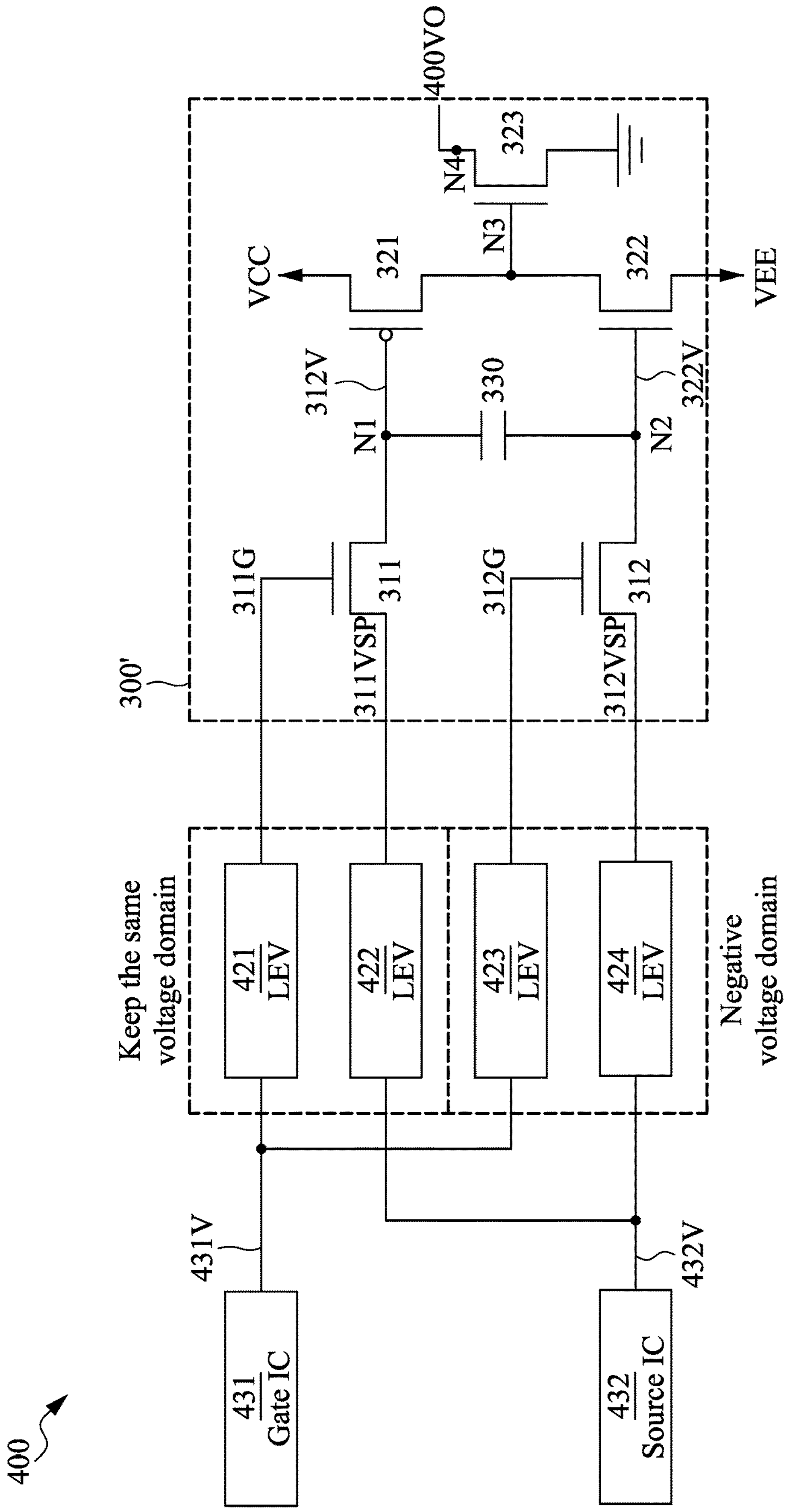
FIG. 4 is a schematic diagram of a pixel electrode circuit 400 in accordance with yet another embodiment of the present disclosure.

FIG. 4 is a schematic diagram of a pixel electrode circuit 400 in accordance with yet another embodiment of the present disclosure.

In yet another embodiment, the pixel electrode circuit 400 shown in FIG. 4 may include a pixel electrode circuit 300', a plurality of level shifters 421, 422, 423, 424, a gate driver integrated circuit (IC) 431, and a source driver IC 432. The pixel electrode circuit 300' may be similar to the pixel electrode circuit 300 shown in FIG. 3. However, the control signals 311G and 321G, and the input voltage 311VSP and input voltage 312VSP of the pixel electrode circuit 400 may be from the level shifters 421, 423, 422, and 424, respectively.

The gate driver integrated circuit (IC) 431 may provide a first driving voltage 431V to the level shifters (LEVs) 421 and 423. The source driver IC 432 may provide a second driving voltage 432V to the level shifters 422 and 424.

The level shifter 421 may convert the first driving voltage 431V to the control signal 311G, such as converting a first voltage level of the first driving voltage 431V to a second voltage level of the control signal 311G. The level shifter 422 may convert the second driving voltage 432V to the input voltage 311VSP, such as converting a third voltage level of the second driving voltage 432V to a fourth voltage level of the input voltage 311VSP. It should be noted that the control signal 311G, the input voltage 311VSP, and the first driving voltage 431V are kept in the same voltage domain by the level shifters 421 and 422.

The delay of each path of the control signals 311G and 312G, and the input voltage 311VSP and 312VSP may differ. The level shifters 421, 422, 423, 424 may be used to balance the delays of the control signals 311G and 312G, and the input voltage 311VSP and 312VSP. The control signal 311G and the input voltage 311VSP may be substantially provided to the transistor 311 at the same time. The control signal 312G and the input voltage 312VSP may be substantially provided to the transistor 312 at the same time.

The level shifter 423 may convert the first driving voltage 431V to the control signal 312G, such as converting the third voltage level of the second driving voltage to a fifth voltage level of the control signal 312G. The level shifter 424 may convert the second driving voltage 432V to the input voltage 312VSP, such as converting the third voltage level of the second driving voltage 432V to a sixth voltage level of the control signal 312G. It should be noted that the second driving voltage 432V may be in a positive voltage domain. The control signal 312G and the input voltage 312VSP respectively generated from the level shifters 423 and 424 may be in a negative voltage domain. Therefore, the voltage swing range of the transistor 311 in FIG. 4 may be similar to that of the transistor 311 in FIG. 3. The voltage swing range of the transistor 312 in FIG. 4 may be similar to that of the transistor 312 in FIG. 3. A result of voltage stress test will be enhanced.

Figure 5:
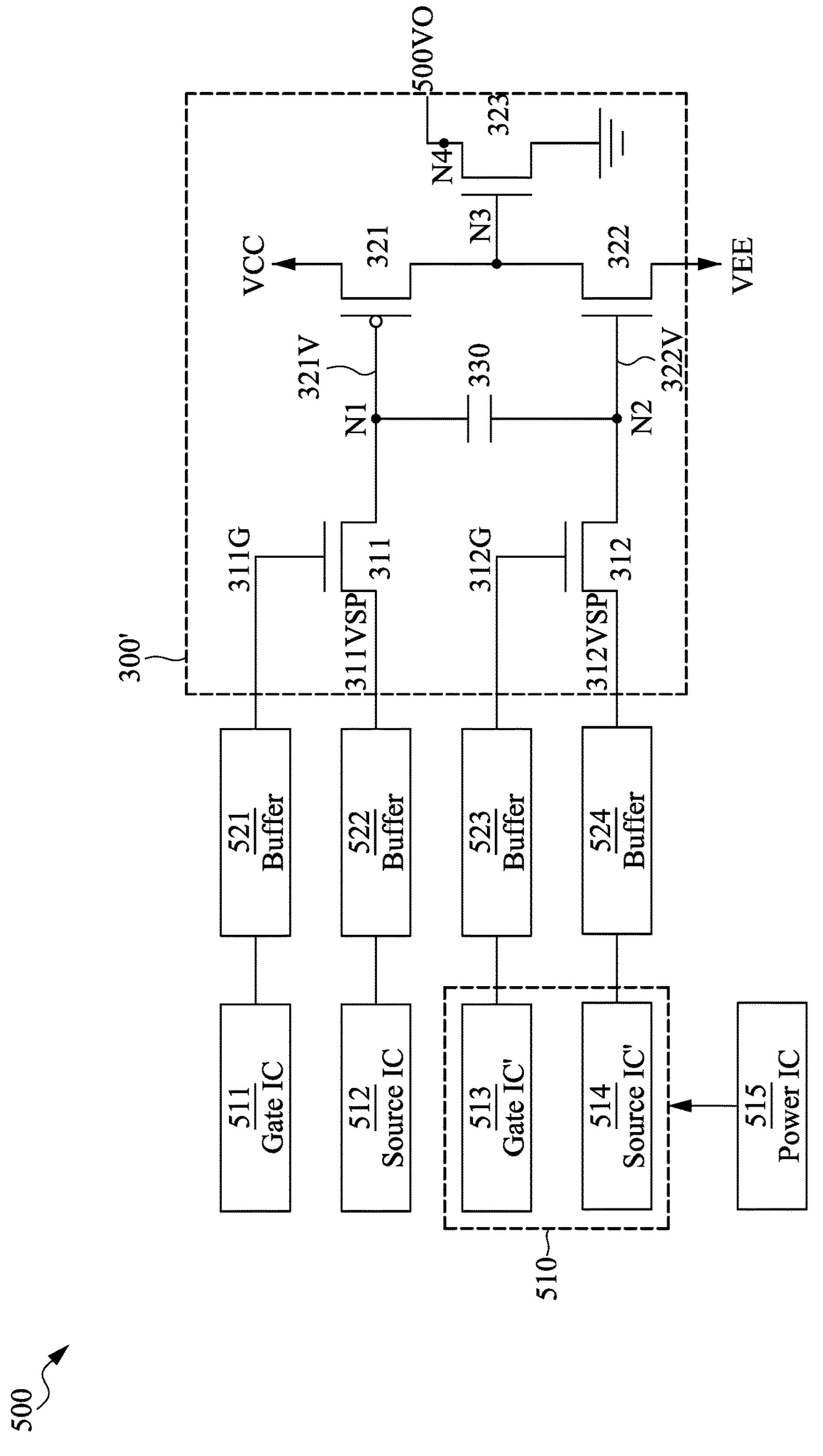
FIG. 5 is a schematic diagram of a pixel electrode circuit 500 in accordance with yet another embodiment of the present disclosure.

FIG. 5 is a schematic diagram of a pixel electrode circuit 500 in accordance with yet another embodiment of the present disclosure.

The design concept of the pixel electrode circuit 500 in FIG. 5 may be similar to that of the pixel electrode circuit 400 in FIG. 4. For example, the pixel electrode circuit 500 in FIG. 5 may include a pixel electrode circuit 300', a plurality of buffers 521, 522, 523, 524, gate driver integrated circuits (ICs) 511 and 513, source driver ICs 512 and 514, and a power IC 515.

In some embodiment, the gate driver integrated circuit (IC) 513 and the source driver IC 514 may receive a voltage in the negative voltage domain from the power IC 515. The gate driver integrated circuit (IC) 513 may convert the voltage received from the power IC 515 to the control signal to 312G through the buffer 523. The control signal to 312G may be stored in the buffer 523. The source driver IC 514 may convert the voltage received from the power IC 515 to the input voltage 312VSP through the buffer 524. The input voltage 312VSP may be store in the buffer 524. The gate driver integrated circuit (IC) 511 may provide the control signal 311G in the positive voltage domain through the buffer 521. The control signal 311G may be stored in the buffer 521. The source driver IC 512 may provide the input voltage 311VSP in the positive voltage domain through the buffer 522. The input voltage 311VSP may be stored in the buffer 522.

The voltage swing range of the transistor 311 in FIG. 5 may be similar to that of the transistor 311 in FIG. 3. The voltage swing range of the transistor 312 in FIG. 5 may be similar to that of the transistor 312 in FIG. 3, thereby increasing the probability of passing the voltage stress test.

Figure 6:
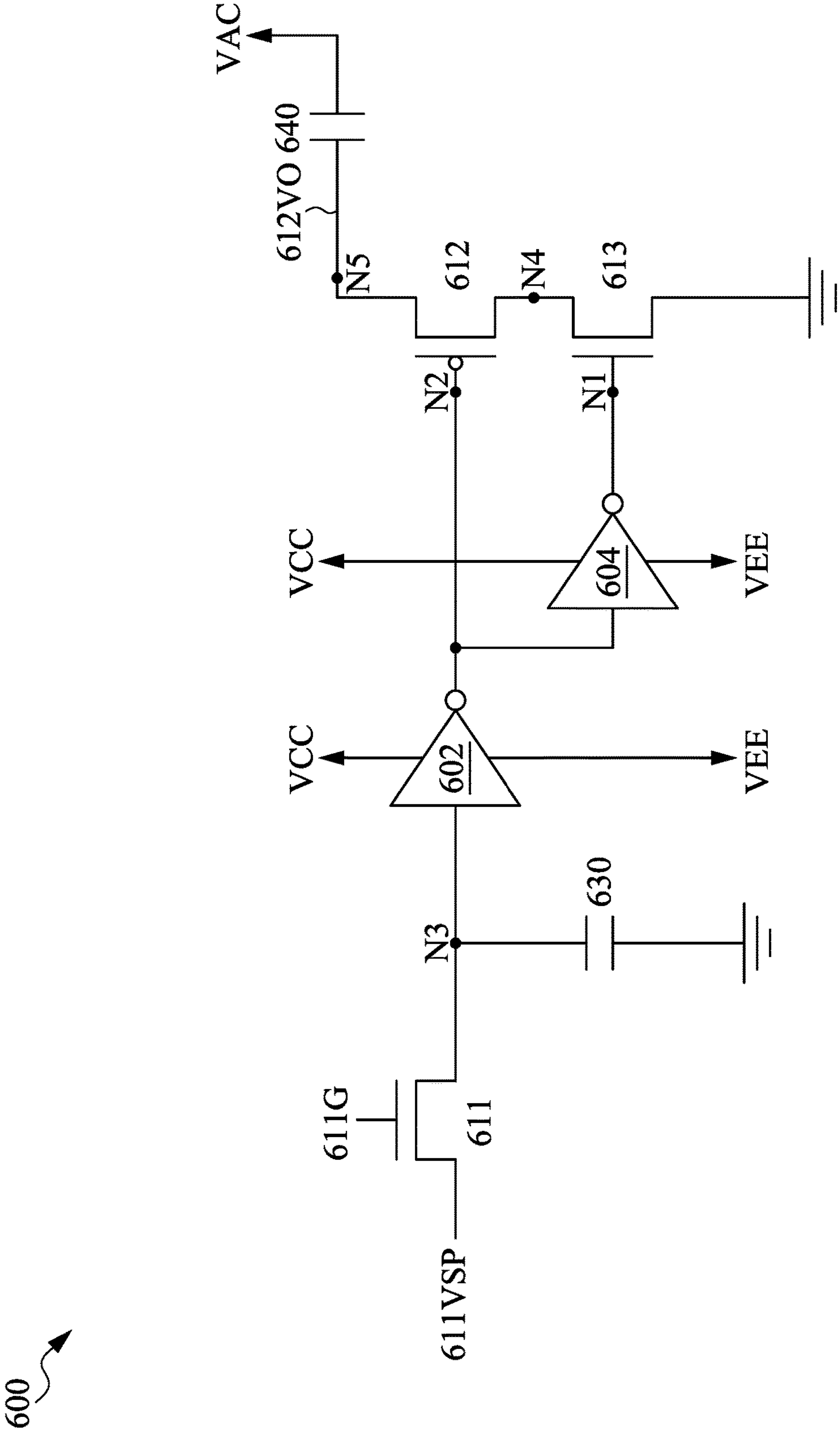
FIG. 6 is a schematic diagram of a pixel electrode circuit 600 in accordance with yet another embodiment of the present disclosure.

FIG. 6 is a schematic diagram of a pixel electrode circuit 600 in accordance with yet another embodiment of the present disclosure.

In yet another embodiment, there may be some signal skews at nodes N1 and N2 in the pixel electrode circuit 300 in FIG. 3 or the pixel electrode circuit 300' in FIGS. 4 and 5, it may cause some short current flowing through the transistors 321 and 322. As a result, the short current will cause redundant power consumption, or damage the transistors if the signal skew is too large.

The pixel electrode circuit 600 shown in FIG. 6 is proposed to solve the signal skew issue and simplify the power domain of the pixel electrode circuits in FIGS. 4 and 5.

As shown in FIG. 6, the pixel electrode circuit 600 may be a cascode pull-down circuit, which includes transistors 611, 612, and 613, inverters 602 and 604, and a capacitor 630.

The transistor 611 may be a switch controlled by the control signal 611G. The transistor 611 may have a first terminal coupled to the input voltage 611VSP. The transistor 611 may have a second terminal coupled to a third node N3.

The inverters 602 and 604 may form a cascode inverter stage supplied with power supply voltages VCC and VEE. The inverter 602 may have an input terminal coupled to node N3, and an output terminal coupled to node N2. The inverter

604 may have an input terminal coupled to node N2, and an output terminal coupled to node N1.

The transistor 612 may have a gate coupled to node N2. The transistor 612 may have a drain coupled to node N4. The transistor 612 may have a source coupled to node N5 which refers to an output terminal (i.e., node N5) of the pixel electrode circuit 600 providing an output voltage 612VO.

The transistor 613 may have a gate coupled to node N1. The transistor 613 may have a drain coupled to node N4. The transistor 613 may have a source coupled to the ground.

In some embodiment, the transistor 611 may be an N-type transistor, the transistor 612 may a P-type transistor, and the transistor 613 may be an N-type transistor.

The capacitor 630 is coupled between node N3 and the ground. Equivalent capacitance 640 is an equivalent capacitance between the top plate electrode and the output terminal of the pixel electrode circuit 600. The voltage signal VAC is an AC voltage signal. The voltage signal VAC may be applied to the top plate electrode 110 as shown in FIG. 1. A terminal of the equivalent capacitance 640 may be coupled to the output terminal (i.e., node N5) of the pixel electrode circuit 600.

For example, the input voltage 611VSP may range between VCC and VEE, and it will charge the capacitor 630. When the pixel electrode circuit 600 enters a pull-down mode, the input voltage 611VSP is equal to the power supply voltage VCC (i.e., VSP=VCC), and the voltage at node N2 is equal to the power supply voltage VEE, and the voltage at node N1 is equal to the power supply voltage VCC. For purposes of description, it is assumed that VEE=−Vee and VCC=+Vcc, and the voltage signal VAC may be an AC voltage signal swing between +Vac and −Vac. In this case, both the transistors 612 and 613 will be turned on, and therefore the output terminal (i.e., node N5) of the pixel electrode circuit 600 will be pulled down to the ground even though node N5 is coupled to the voltage signal VAC through the equivalent capacitance 640. Referring to the AM-EWOD system 100 of FIG. 1, there is a voltage difference between the dielectric layer 120 and the top plate electrode 110, and it will change the contact angle of the droplet 130 to control movement of the droplet 130.

In addition, when the pixel electrode circuit 600 enters a floating mode, the input voltage 611VSP is equal to the power supply voltage VEE (i.e., VSP=VEE), and the voltage at node N2 is equal to the power supply voltage VCC, and the voltage at node N1 is equal to the power supply voltage VEE. In this situation, the voltage 612VO at node N5 may follow the voltage signal VAC through the equivalent capacitance 640. For example, if the voltage 612VO at node N5 is positive, the transistor 612 may be turned on, but the transistor 613 is turned off due to the negative input voltage at node N1. The voltage 612VO at the output terminal (i.e., node N5) of the pixel electrode circuit 600 will not be pulled down to the ground since the current path flowing through the transistors 612 and 613 does not exist. Therefore, the output terminal (i.e., node N5) of the pixel electrode circuit 600 will be floating in this case, and the voltage 612VO at node N5 may follow the voltage signal VAC through the equivalent capacitance 640.

If the voltage 612VO at node N5 is negative, the transistor 612 will be turned off, and thus the voltage 612VO at the output terminal (i.e., node N5) of the pixel electrode circuit 600 will not be pulled down to the ground either. Therefore, the output terminal (i.e., node N5) of the pixel electrode circuit 600 will be floating in this case, and the voltage 612VO at node N5 may follow the voltage signal VAC through the equivalent capacitance 640. Therefore, when the pixel electrode circuit 600 enters the floating mode, the voltage 612VO at the output terminal (i.e., node N5) of the pixel electrode circuit 600 will be similar to the voltage signal VAC due to the coupling effect, and there will be no voltage difference between the pixel electrode circuit 600 and the top plate electrode 110, and the droplet 130 will not move at this time. In some embodiments, the transistor 612 may be an N-type transistor, and the transistor 613 may be a P-type transistor, and the operations thereof may be similar to those described above.

Figure 7:
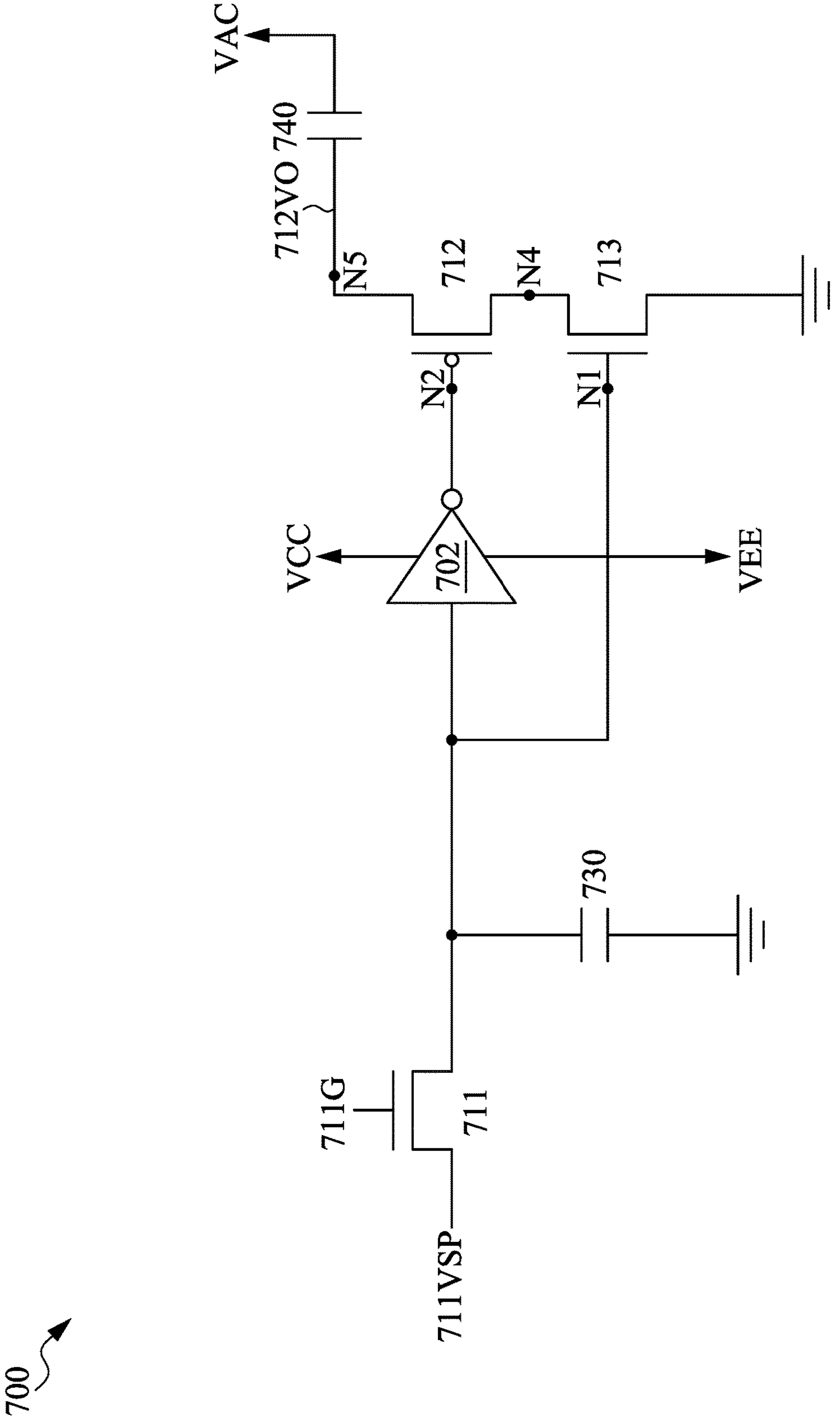
FIG. 7 is a schematic diagram of a pixel electrode circuit 700 in accordance with yet another embodiment of the present disclosure.

FIG. 7 is a schematic diagram of a pixel electrode circuit 700 in accordance with yet another embodiment of the present disclosure.

In yet another embodiment, the pixel electrode circuit 700 shown in FIG. 7 may be similar to the pixel electrode circuit 600 shown in FIG. 6. The pixel electrode circuit 700 may be a cascode pull-down circuit with only one inverter. In some embodiment, the inverter 604 shown in FIG. 6 may be omitted. In the embodiment of FIG. 7 the capacitor 730 is coupled between node N1 and the ground. The inverter 702 is coupled between node N1 and node N2. The gate of the transistor 713 is coupled to node N1. The operations of the transistors 712 and 713 in FIG. 7 may be similar to those of the transistors 612 and 613 in FIG. 6, and thus details thereof are not repeated here. In some embodiment, the transistor 711 may be an N-type transistor, the transistor 712 may be a P-type transistor, and the transistor 713 may be an N-type transistor. In some embodiments, the transistor 712 may be an N-type transistor, and the transistor 713 may be a P-type transistor.

Figure 8:
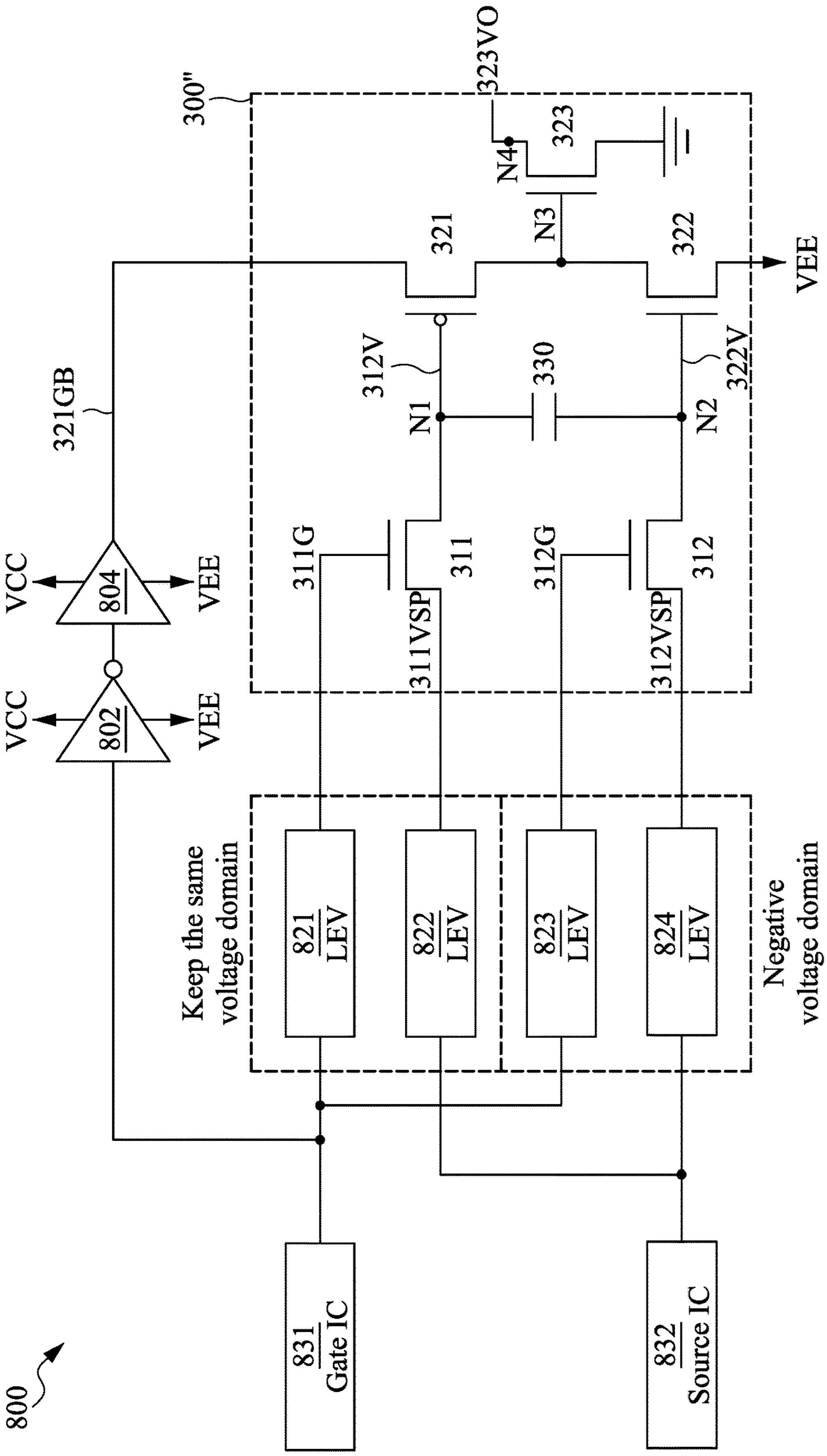
FIG. 8 is a schematic diagram of a pixel electrode circuit 800 in accordance with yet another embodiment of the present disclosure.

FIG. 8 is a schematic diagram of a pixel electrode circuit 800 in accordance with yet another embodiment of the present disclosure.

Figure 9:
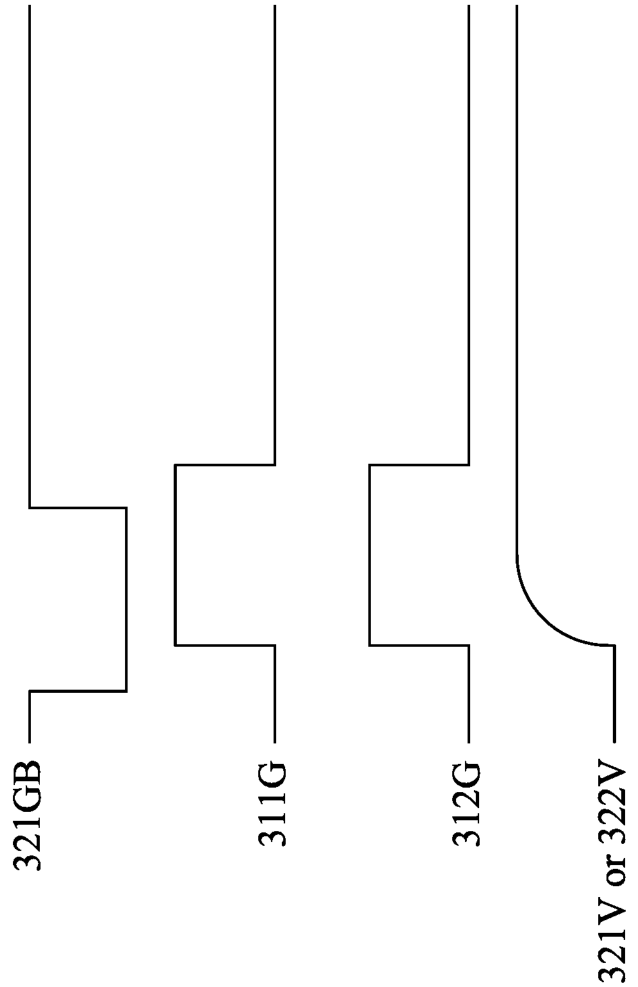
FIG. 9 is a waveform diagram of various signals in the pixel electrode circuit 800 in accordance with the embodiment of FIG. 8.

FIG. 9 is a waveform diagram of various signals in the pixel electrode circuit 800 in accordance with the embodiment of FIG. 8.

In yet another embodiment, the pixel electrode circuit 800 shown in FIG. 8 may be similar to the pixel electrode circuit 400 shown in FIG. 4. The pixel electrode circuit 800 may include a pixel electrode circuit 300", an inverter 802, a buffer 804, a plurality of level shifters (LEVs) 821, 822, 823, 824, a gate driver integrated circuit (IC) 831, and a source driver IC 832.

The source of the transistor 321 in the pixel electrode circuit 300" may be coupled to a control signal 321GB. In one embodiment, the driving voltage generated by the gate driver IC 831 may be sent to the inverter 802. The inverter 802 provides the output voltage refers to the control signal 321GB. The control signal may be stored in the buffer 804.

Referring to FIG. 1B, the pixel electrodes 121 may be arranged in a two-dimensional array of M rows*N columns. The pixel electrodes 121 in each row may have a respective control signal 321GB. M row pixel electrodes provides 321GB1 to 321GBM (not shown in FIG. 8). When the pixel electrodes 121 are implemented using the pixel electrode circuit 800, the pixel electrodes 121 in the same row may share the same control signal 321GB.

Please refer to FIG. 9 which is a waveform diagram of signals in the pixel electrode circuit 800 of FIG. 8, including the a control signal 321GB, control signal 311G, control signal 312G, an input voltage 321V, and input voltage 322V. In some embodiments, the delay of the control signal 321GB may be shorter than that of the control signal 311G and control signal 312G via proper circuit design.

When the first driving voltage provided by the gate driver IC 831 is switched from the high logic state to the low logic state, the control signal 321GB will be switched to the low logic state (i.e., a relatively low voltage) prior to the control signal 311G and control signal 312G being switched to the low logic state. In response to the control signal 321GB being in the low logic state, the transistor 321 is turned off. In this case, the signal skews of the control signal 311G, control signal 312G, input voltage 311VSP, and input voltage 312VSP will not cause any short circuit current since the transistor 321 is turned off.

After the control signal 321GB is switched to the high logic state (i.e., a relatively high voltage), the transistor 321 may function normally as described in the embodiment of FIG. 4.

Figure 10:
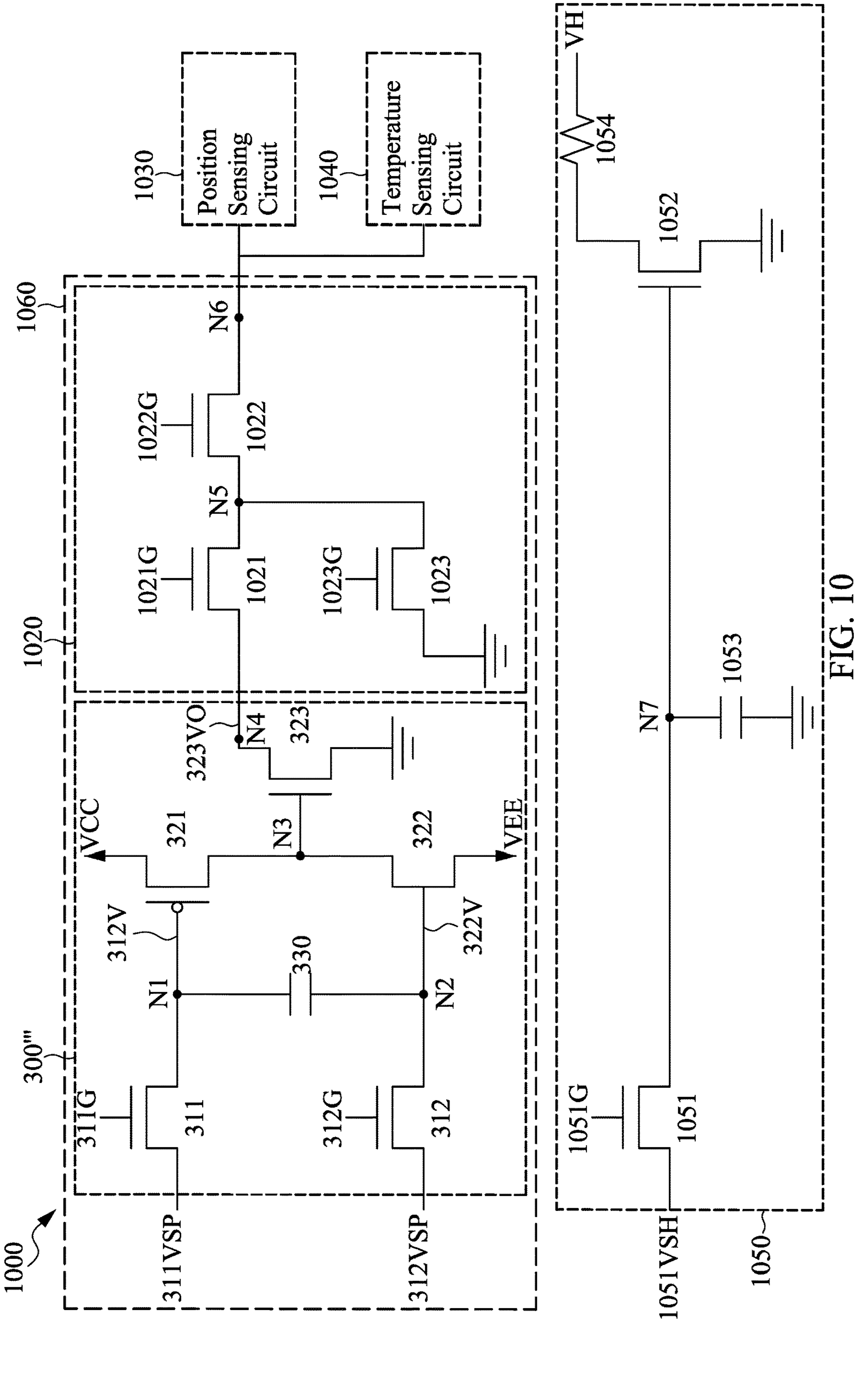
FIG. 10 is a schematic diagram of an AM-EWOD driving system 1000 in accordance with an embodiment of the present disclosure.

FIG. 10 is a schematic diagram of an AM-EWOD driving system 1000 in accordance with an embodiment of the present disclosure.

Figure 11:
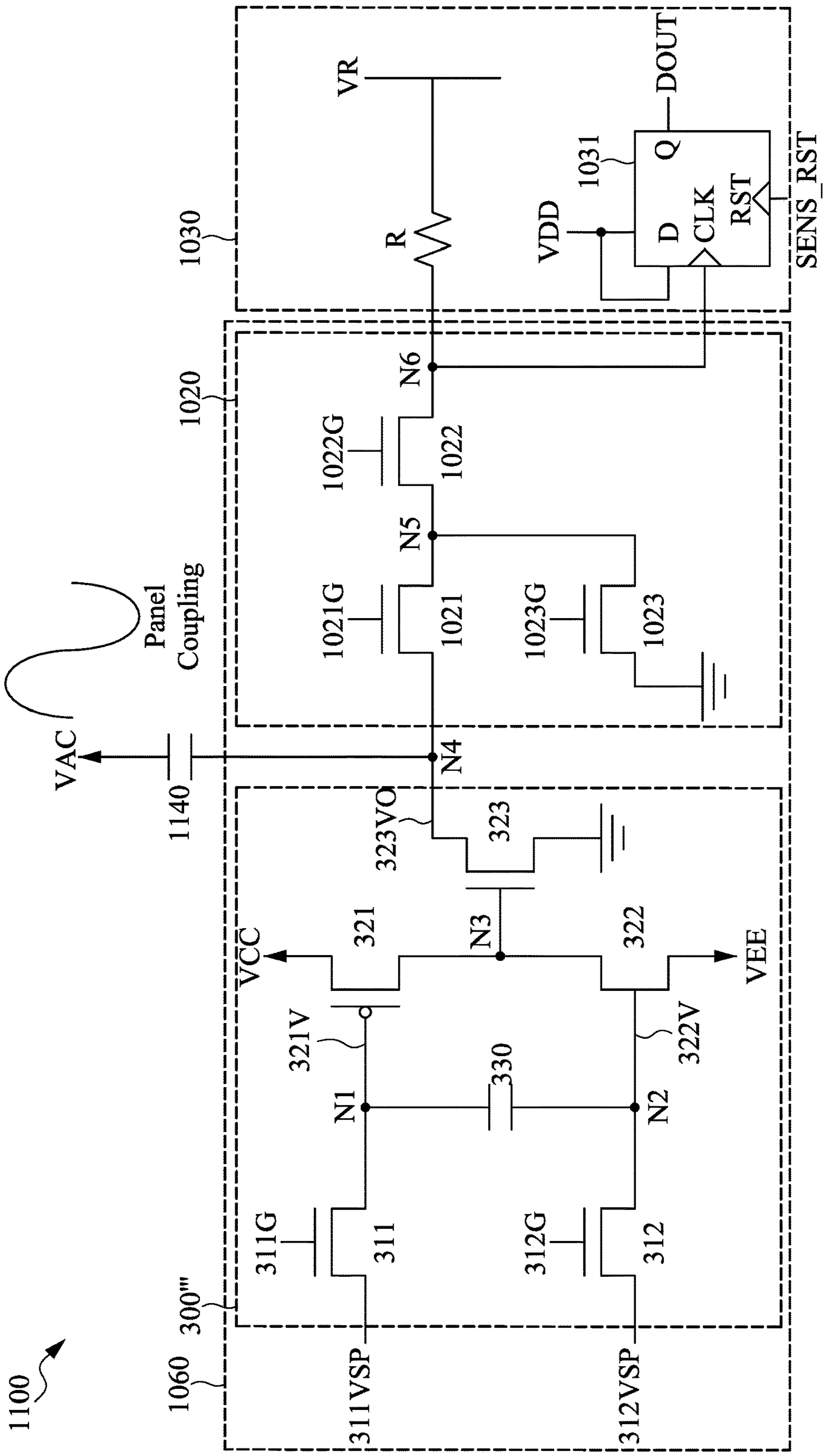
FIG. 11 is a schematic diagram of the AM-EWOD driving system 1000 including the output stage of the pixel electrode circuit 300''', the detection control circuit 1020, and the position detection circuit 1030 in accordance with the embodiment of FIG. 10.

FIG. 11 is a schematic diagram of the AM-EWOD driving system 1100 including the output stage of the pixel electrode circuit 300''', the detection control circuit 1020, and the position detection circuit 1030 in accordance with the embodiment of FIG. 10.

Figure 12:
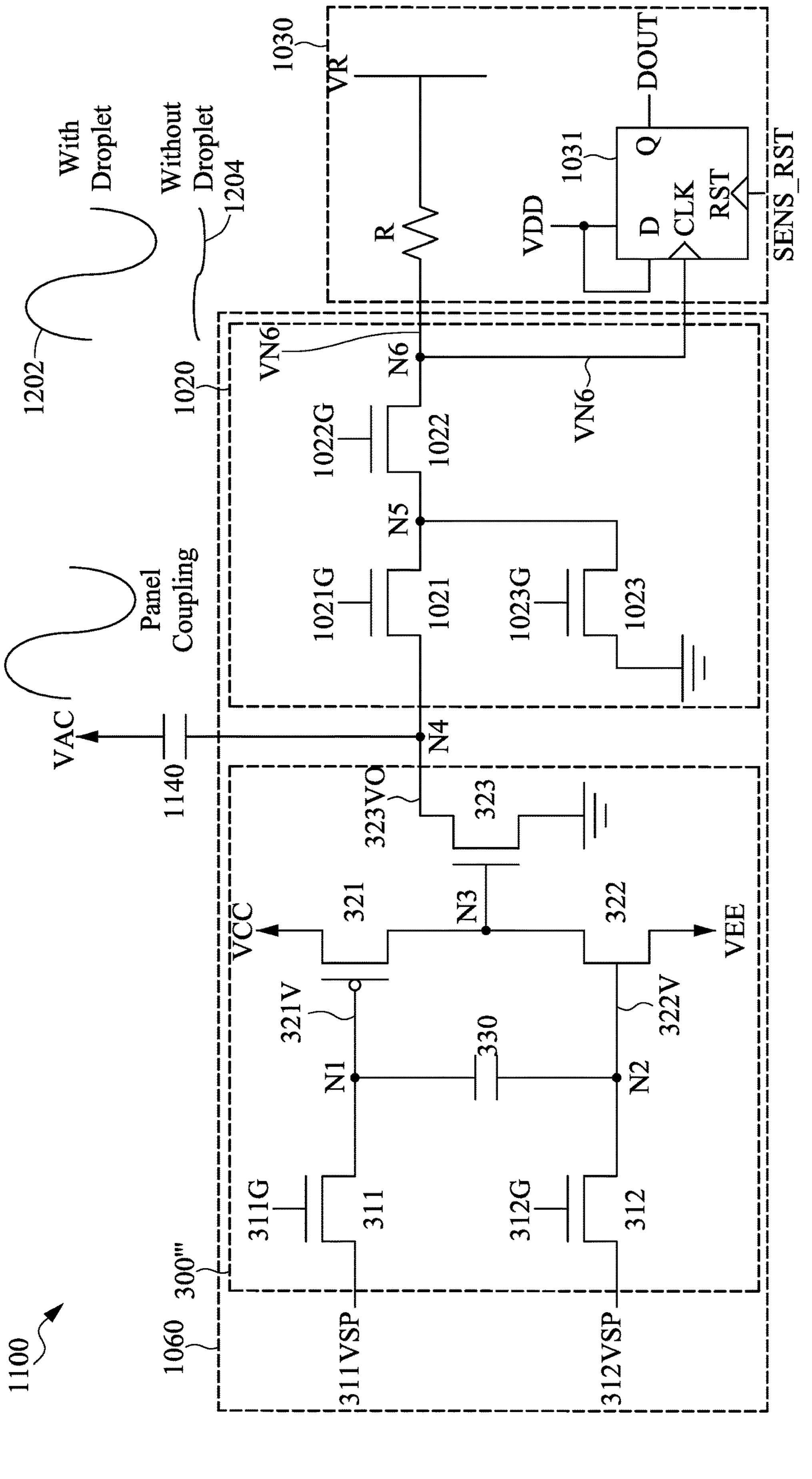
FIG. 12 is a diagram showing the voltage amplitude at node N6 with different droplet conditions in accordance with the embodiment of FIG. 11.

FIG. 12 is a schematic diagram of the AM-EWOD driving system 1100 showing the voltage amplitude at node N6 with different droplet conditions in accordance with the embodiment of FIG. 11.

Figure 13A:
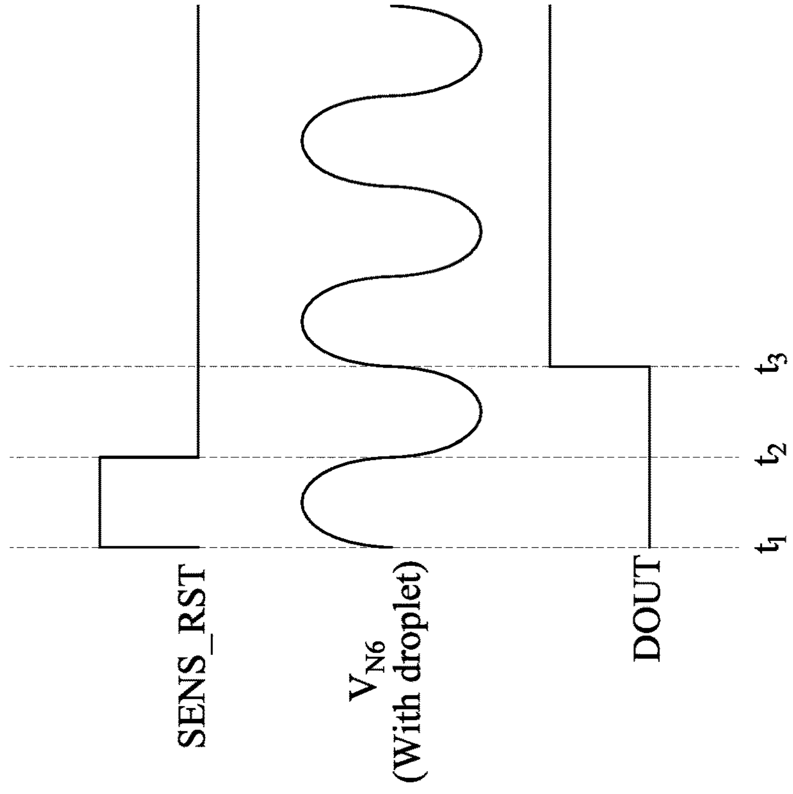
FIGS. 13A-13B are waveform diagrams illustrating the reset signal SENS_RST, the voltage at node N6, and the output data signal of the D flip-flop in accordance with the embodiment of FIG. 12.
Figure 13B:
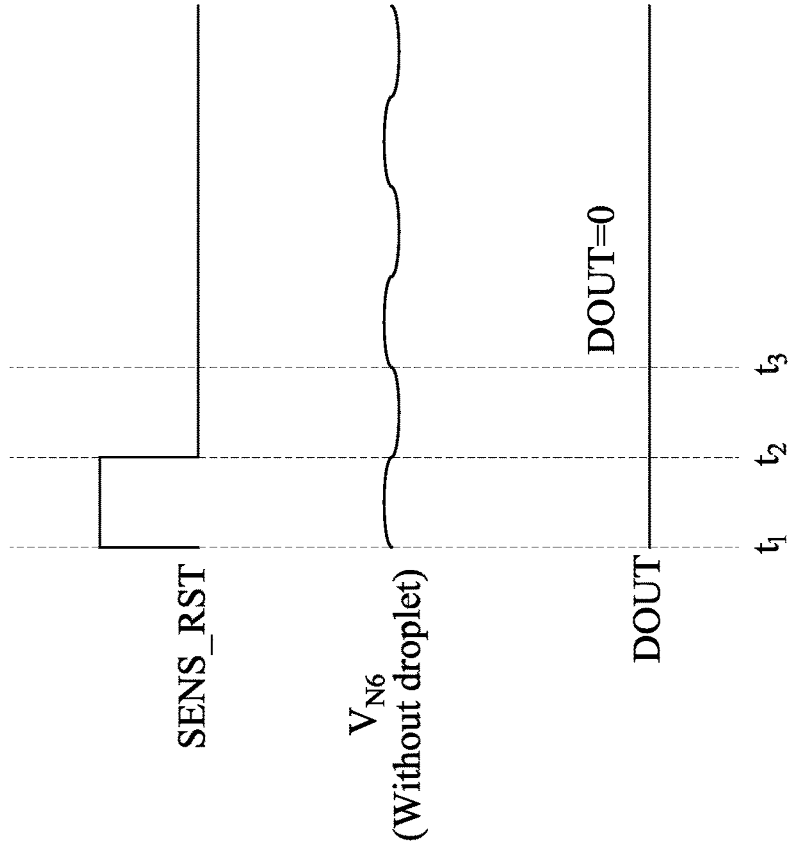

FIGS. 13A-13B are waveform diagrams illustrating the reset signal SENS_RST, the voltage at node N6, and the output data signal of the D flip-flop in accordance with the embodiment of FIG. 12.

In another embodiment, the AM-EWOD driving system 1000 is not only capable of controlling movement of the droplet therein, but also capable of detecting the position and temperature of the droplet. Controlling the movement of the droplet and detecting its position and temperature may be necessary for a PCR (Polymerase Chain Reaction) procedure. In an embodiment, the AM-EWOD driving system 1000 may include a pixel electrode circuit 300''', a detection control circuit 1020, a position detection circuit 1030, a temperature detection circuit 1040, and a heating circuit 1050. For brevity, the position detection circuit 1030 and the temperature detection circuit 1040 are illustrated as blocks in FIG. 10, and the details thereof are described in the embodiments of FIGS. 12-14. In addition, for purposes of description, the pixel electrode circuit 300''' may be similar to the pixel electrode circuit 300 shown in FIG. 3, but any of the pixel electrode circuits described in the embodiments of FIGS. 2 and 4-8 can be used as well. For example, the output terminal (i.e., node N4) of the pixel electrode circuit 300''' may be coupled to the detection control circuit 1020.

In some embodiments, the detection control circuit 1020 may be integrated with each of the pixel electrodes 121 of the AM-EWOD system 100 shown in FIG. 1A. The position detection circuit 1030 and the temperature detection circuit 1040 may be arranged outside each of the pixel electrodes 121 of the AM-EWOD system 100 shown in FIG. 1A. In some other embodiments, the detection control circuit 1020 may be disposed outside each of the pixel electrodes 121 shown in FIG. 1A. For purposes of description, the pixel electrode circuit 300''' and the detection control circuit 1020 may be collectively regarded as a pixel circuit 1060.

The detection control circuit 1020 may be configured to control the detection mode of the AM-EWOD driving system 1000, and may include transistor 1021, transistor 1022, and transistor 1023.

The transistor 1021 may be a switch controlled by a position selection signal 1021G, and may have a first terminal connected to the output terminal (i.e., node N4) of the pixel electrode circuit 300''', and a second terminal connected to node N5. The transistor 1022 may be a switch controlled by a control signal 1022G, and may have a first terminal connected to node N5, and a second terminal connected to node N6. Node N6 may be connected to the position detection circuit 1030 and the temperature detection circuit 1040. The transistor 1023 may be a switch controlled by a temperature selection signal 1023G, and may have a first terminal connected to node N5, and a second terminal connected to the ground.

The heating circuit 1050 may include transistors 1051 and 1052, a capacitor 1053, and a heating resistor 1054. The transistors 1051 and 1052 may be used for the heating function of the AM-EWOD driving system 1000. The heating transistor 1051 may be a switch controlled by the control signal 1051G. The heating transistor 1051 may have a first terminal connected to the input voltage 1051VSH, and a second terminal connected to node N7. The capacitor 1053 is coupled between node N7 and the ground. The transistor 1052 may have a gate coupled to node N7, a terminal (such as a drain) coupled to the heating resistor 1051, and a terminal (such as a source) coupled to the ground.

When the AM-EWOD driving system 1000 enters a heating mode, the input voltage 1051VSH and the control signal 1051G may be in the high logic state. At this time, the heating transistor 1051 is turned on. The input voltage 1051VSH may be stored in the capacitor 1053. The node N7 may be also in the high logic state. Thus, the transistor 1052 is turned on, and a current generated from the transistor 1052 may flow through the heating resistor 1054 to the ground to start generating heat on the heating resistor 1054.

Referring to FIG. 11, the detailed schematic diagram of the position detection circuit 1030 is illustrated. In one embodiment, the position detection circuit 1030 may include a D flip-flop 1031 and a resistor R. The D flip-flop 1031 may have a data terminal D, an input clock terminal CLK, a reset terminal RST, and an output terminal Q. The data terminal D may be connected to the power supply voltage VDD, and the input clock terminal CLK may be connected to node N6, and the reset terminal may receive an asynchronous reset signal SENS_RST.

When the AM-EWOD driving system 1100 enters a position detection mode, the voltage at node N3 may be in the low logic state (i.e., a relatively low voltage) to turn off the transistor 323, and thus the output terminal (i.e., node N4) of the pixel electrode circuit 300''' may be floating. In such a condition, the voltage 323VO at node N4 may follow the voltage signal VAC (i.e., an AC voltage signal) due to the coupling effect. The node N4 is coupled to a top plate electrode through the equivalent capacitance 1140. The equivalent capacitance 1140 is arranged between the pixel electrode circuit 300''' and a top plate electrode of the AM-EWOD system 100, as described in the embodiment of FIG. 1A. The amplitude of the voltage 323VO may be determined by the equivalent capacitance 1140.

If a droplet exists between the pixel electrode circuit 300''' and a top plate electrode, the equivalent capacitance 1140 will be larger, and the amplitude of the coupled voltage signal at node N4 will also be higher. In such a condition, the coupled voltage signal at node N4 may be substantially the same as the voltage signal VAC. Referring to FIG. 12, the curve 1202 shows the change of the coupled voltage signal at node N6 with a droplet existing between the pixel electrode circuit 300''' and a top plate electrode.

If no droplet 130 exists between the pixel electrode circuit 300''' and a top plate electrode, the equivalent capacitance 1140 will be lower, and the amplitude of the coupled voltage signal at node N4 will also be lower. In such a condition, the coupled voltage signal at node N4 may be very low. Referring to FIG. 12, the curve 1204 shows the change of the coupled voltage signal at node N6 without a droplet existing between the pixel electrode circuit 300''' and a top plate electrode.

In one embodiment, when the AM-EWOD driving system 1100 enters the position detection mode, both the position selection signal 1021G and the control signal 1022G are in the high logic state, and the temperature selection signal 1023G is in the low logic state. The transistors 1021 and 1022 are turned on, and the transistor 1023 is turned off. In addition, the asynchronous reset signal SENS_RST may be asserted to initialize or reset the output data signal DOUT (e.g., DOUT is reset to 0) at the output terminal Q of the D flip-flop 1031. In such a condition, nodes N4 and N6 may be substantially the same node, and the voltage at node N6 may be fed to the input clock terminal CLK of the D flip-flop 1031.

In the first case, when a droplet exists between the pixel electrode circuit 1010 and the top plate electrode, it indicates that the equivalent capacitance 1140 may be higher, and the amplitude of the voltage VN6 at node N6 may also be higher, as shown by curve 1202 in FIG. 12.

In the second case, when no droplet 130 exists between the pixel electrode circuit 1010 and the top plate electrode 110, it indicates that the equivalent capacitance CD may be smaller, and the amplitude of the voltage VN6 at node N6 may also be lower, as shown by curve 1204 in FIG. 12.

In one embodiment, the voltage VN6 at node N6 is fed into the input clock terminal CLK of the D flip-flop 1031. The D flip-flop 1031 will be triggered by a rising edge (or a falling edge) of the voltage VN6 if the amplitude of the voltage VN6 is high enough (e.g., being equal to or higher than the trigger voltage of the high logic state of the D flip-flop 1031).

Referring to FIG. 13A, in the first case, the amplitude of the voltage VN6 at node N6 may be equal to or higher than the voltage of the high logic state of the D flip-flop 1031. Upon initialization of the position detection circuit 1030, the asynchronous reset signal SENS_RST is asserted to the high logic state at time t1 to reset output data signal DOUT at the output terminal Q of the D flip-flop 1031, and the output data signal DOUT is kept at the low logic state. When the asynchronous reset signal SENS_RST is de-asserted to the low logic state at time t2, the D flip-flop 1031 may start working normally. Because the amplitude of the voltage VN6 may be high enough, the rising edge of the voltage VN6 may trigger the D flip-flop 1031 at time t3, and the output data signal DOUT at the output terminal Q will follow the input of the data terminal D, which is the high logic state (i.e., logic 1).

Referring to FIG. 13B, in the second case, the amplitude of the voltage VN6 at node N6 may be lower than the trigger voltage of the high logic state of the D flip-flop 1031. Upon initialization of the position detection circuit 1030, the asynchronous reset signal SENS_RST is asserted to the high logic state at time t1 to reset output data signal DOUT at the output terminal Q of the D flip-flop 1031, and the output data signal DOUT is kept at the low logic state. When the asynchronous reset signal SENS_RST is de-asserted to the low logic state at time t2, the D flip-flop 1031 may start working normally. Because the amplitude of the voltage VN6 may be not high enough, the rising edge of the voltage VN6 will not trigger the D flip-flop 1031 at time t3, and the output data signal DOUT at the output terminal Q will be kept at the low logic state (i.e., logic 0).

Figure 14:
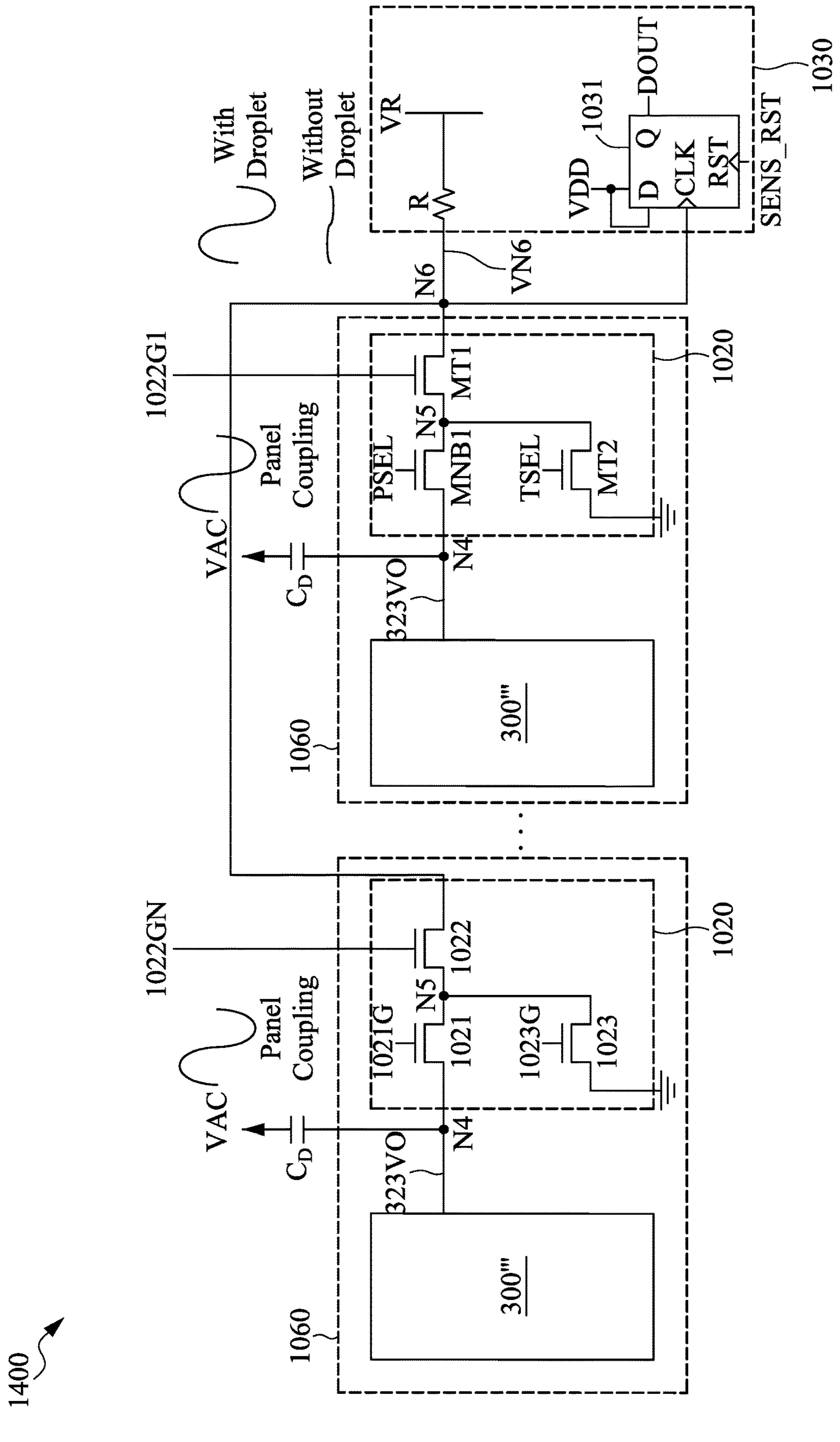
FIG. 14 is a schematic diagram of an AM-EWOD driving system 1400 equipped with a position detection circuit 1030 in accordance with an embodiment of the present disclosure.

FIG. 14 is a schematic diagram of an AM-EWOD driving system 1400 equipped with a position detection circuit 1030 in accordance with an embodiment of the present disclosure.

Figure 15:
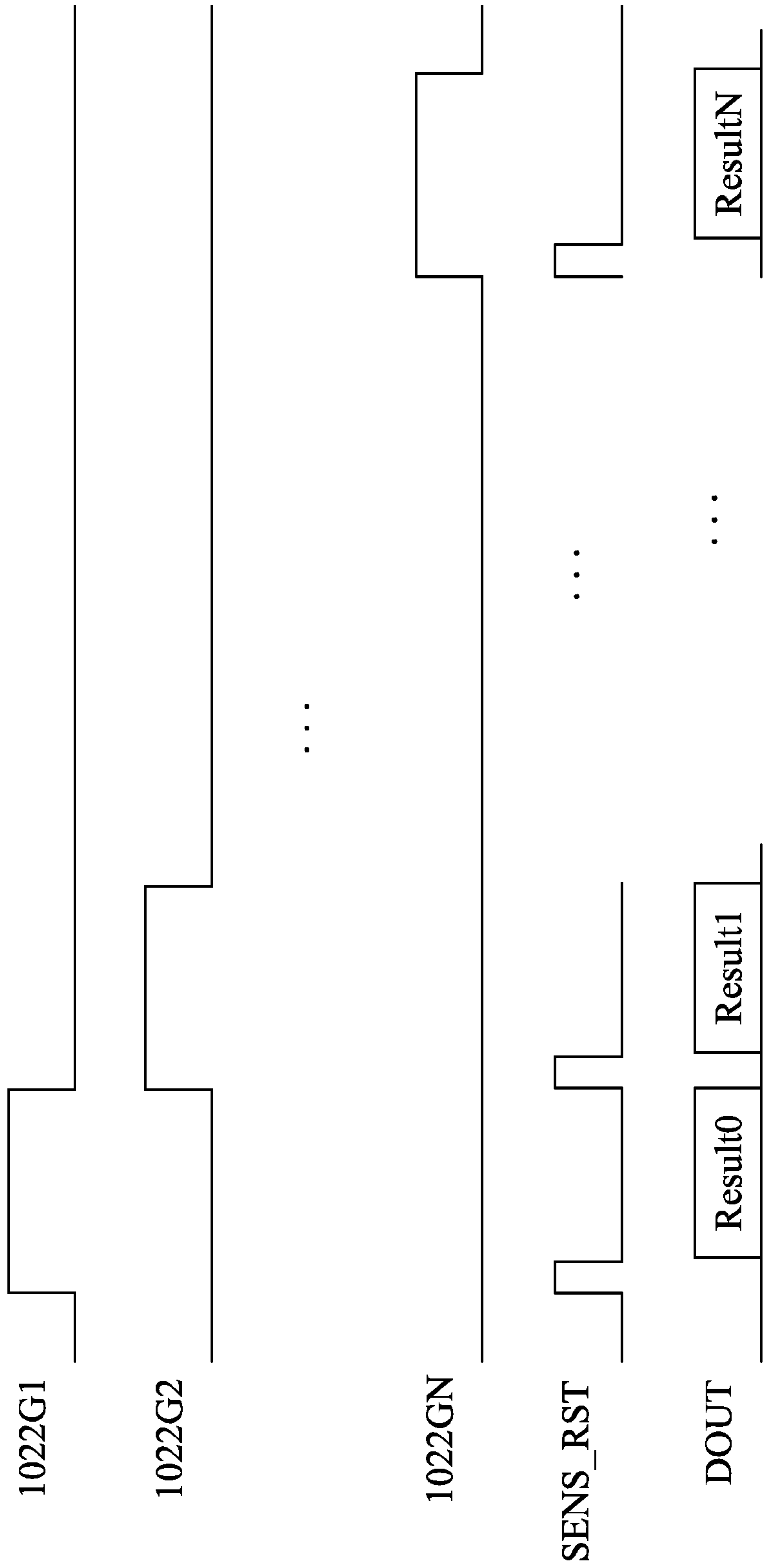
FIG. 15 is a waveform diagram illustrating the timing of position detection operations of the pixel circuit 1060 in the same row in accordance with the embodiment of FIG. 14.

FIG. 15 is a waveform diagram illustrating the timing of position detection operations of the pixel circuit 1060 in the same row in accordance with the embodiment of FIG. 14.

Referring to FIG. 1B, the pixel electrodes 121 may be arranged in a two-dimensional array of M rows*N columns. The technique described in the embodiment of FIG. 10 can be applied to the pixel electrodes 121 in the same row. Each of the pixel electrodes 121 in the same row may be implemented using the pixel circuit 1060 shown in FIG. 10. The pixel circuit 1060 in the same row may share the same position detection circuit 1030, as shown in FIG. 14. Since there are N pixel circuits 1060 in each row, the control signal 1022G provided to the detection control circuits 1020 may be respective control signals such as 1022G1, 1022G2, 1022G3, . . . , 1022GN, wherein the control signals 1022G1 to 1022GN may be generated by a control circuit (not shown) external to the pixel electrodes 121. In some embodiments, the control circuit may be a microcontroller unit (MCU), but the present disclosure is not limited thereto.

Referring to FIG. 15, in some embodiment, the control circuit may assert the control signals 1022G1 to 1022GN one by one in sequence, such as from the control signal 1022G1 (i.e., in the right most pixel electrode circuit) to the control signal 1022GN in sequence, but the present disclosure is not limited thereto. Referring to FIG. 14, when the AM-EWOD driving system 1400 enters the position detection mode, one of the pixel circuit 1060 is activated at one time, and the transistor 1022 in the activated pixel circuit 1060 is turned on, so the voltage 323VO at node N4 of the activated pixel electrode circuit 300''' can be transferred to node N6. Then, the D flip-flop 1031 in the position detection circuit 1030 is reset by the asynchronous reset signal SENS_RST, and the position detection circuit 1030 can work normally to determine whether a droplet 130 exists at the location of the activated pixel circuit 1060. Therefore, after activating the control signals 1022G1 to 1022GN of the pixel electrode circuits 300''' one by one, if a droplet 130 exists in the row on which the pixel circuit 1060 are disposed, the position of the droplet 130 can be determined by way of the operations described in the embodiments of FIGS. 10-13.

In one embodiment, if the output data signal DOUT at the output terminal Q of the D flip-flop 1031 is logic 1, it can be determined that a droplet 130 exists between the activated pixel circuit 1060 and the top plate electrode. In addition, if the output data signal DOUT (e.g., Result0 to ResultN) at the output terminal Q of the D flip-flop 1031 is logic 0, it can be determined that no droplet 130 exists between the activated pixel circuit 1060 and the top plate electrode 110.

Figure 16:
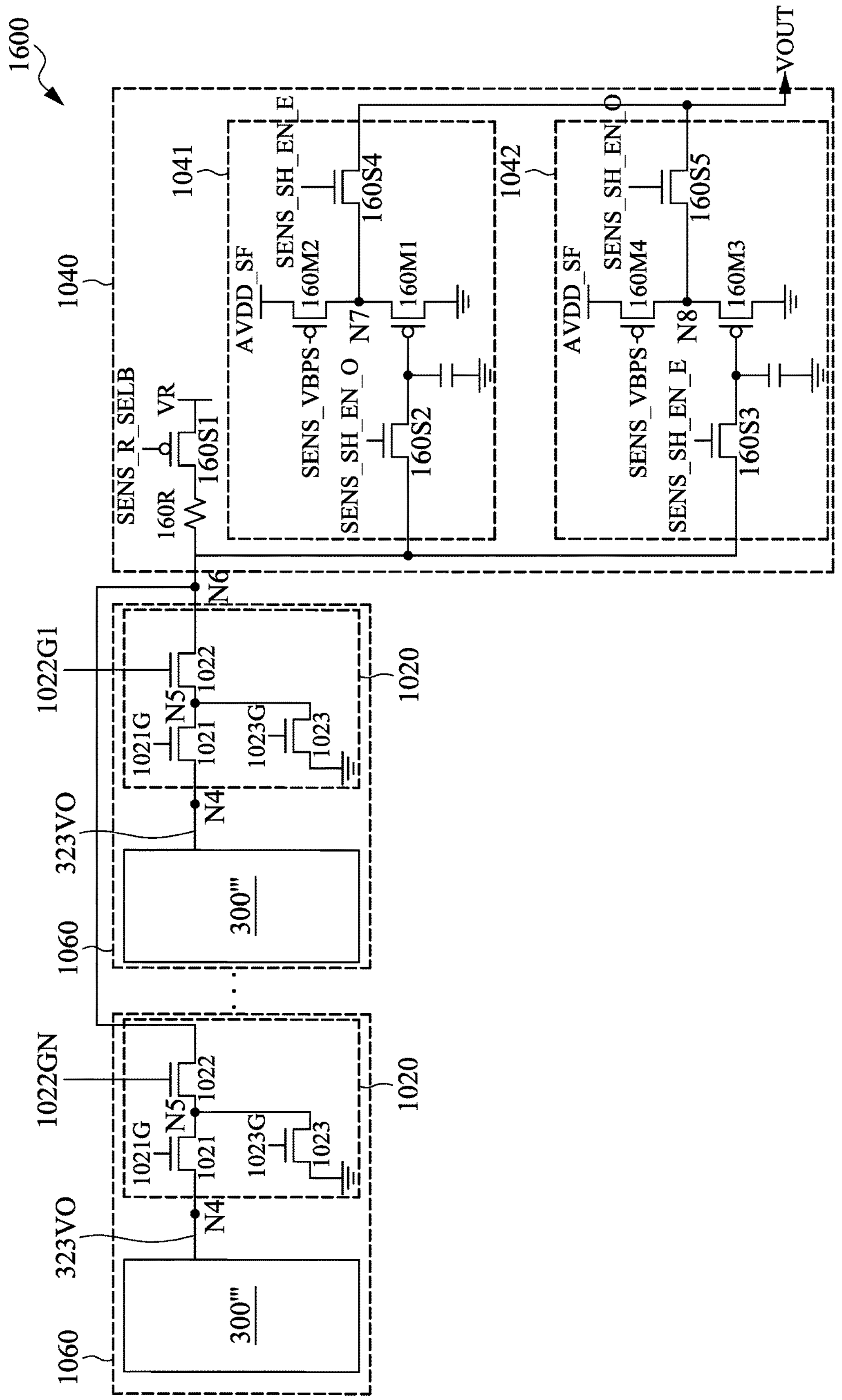
FIG. 16 is a schematic diagram of an AM-EWOD driving system 1600 equipped with a temperature detection circuit 1040 in accordance with an embodiment of the present disclosure.

FIG. 16 is a schematic diagram of an AM-EWOD driving system 1600 equipped with a temperature detection circuit 1040 in accordance with an embodiment of the present disclosure.

Figure 17:
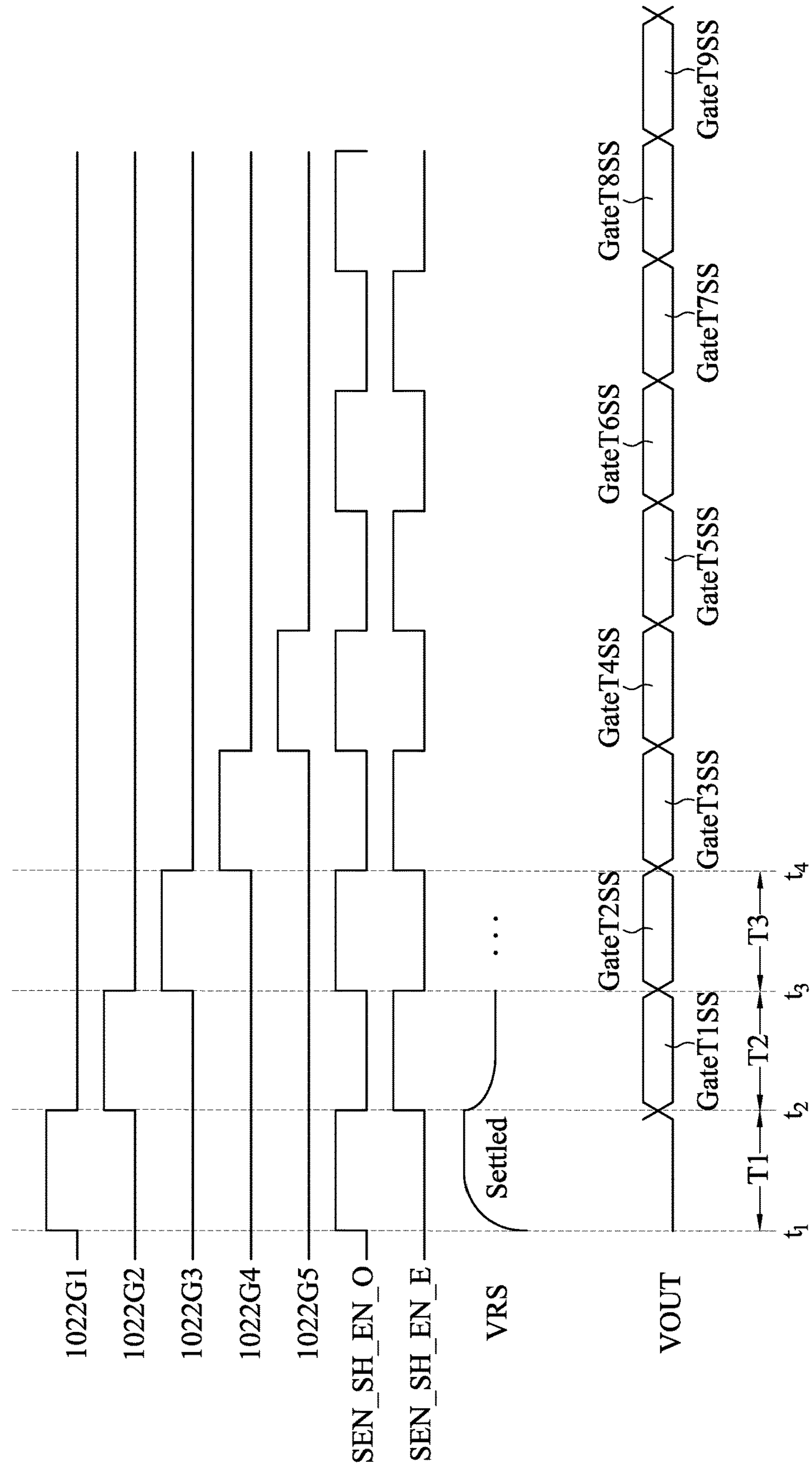
FIG. 17 is a waveform diagram illustrating the timing of position detection operations of the pixel circuit 1060 in the same row in accordance with the embodiment of FIG. 16.

FIG. 17 is a waveform diagram illustrating the timing of position detection operations of the pixel circuit 1060 in the same row in accordance with the embodiment of FIG. 16.

The AM-EWOD driving system 1600 in FIG. 16 may be similar to the AM-EWOD driving system 1400, with the difference therebetween that the AM-EWOD driving system 1600 may include a temperature detection circuit 1040 to detect the temperature of the droplet.

Referring to FIG. 16, the pixel circuit 1060 in the same row may share the same temperature detection circuit 1040. Since there are N pixel circuits 1060 in each row, the control signal 1022G provided to the detection control circuits 1020 may be respective control signals such as 1022G1 to 1022GN, wherein the control signals 1022G1 to 1022GN may be generated by a control circuit (not shown) external to the pixel electrodes. In some embodiments, the control circuit may be a microcontroller unit (MCU), but the present disclosure is not limited thereto.

In an embodiment, the temperature detection circuit 1040 may include a first source follower 1041 and a second source follower 1042. In one embodiment, the temperature detection circuit 1040 may include switch transistors 160S1, 160S2, 160S3, 160S4, 160S5, transistors 160M, 160M2, 160M3, 160M4, and a resistor 160R.

The switch transistor 160S1 may be controlled by a low-active control signal SENS_R_SELB. When the control signal SENS_R_SELB is in the low logic state, the voltage at node N6 can be read out through the resistor 160R. The control signals SENS_SH_EN_O and SENS_SH_EN_E may be in complementary logic states. In one embodiment, when SENS_SH_EN_O=1, SENS_SH_EN_E=0. In a further embodiment, when SENS_SH_EN_O=0, SENS_SH_EN_E=1.

The control signals SENS_SH_EN_O and SENS_SH_EN_E may be used to sample the voltage at node N6 of the activated pixel circuit 1060, and to output the previously sampled voltage as the output voltage VOUT.

In one embodiment, the first source follower 1041 may include the transistors 160M1 and 160M2. The input of the first source follower 1041 (i.e., the gate of the transistor 160M1) may be controlled by the control signal SENS_SH_EN_O. The output terminal (i.e., node N7) of the first source follower 1041 may be controlled by the control signal SENS_SH_EN_E.

The second source follower 1042 may include the transistors 160M3 and 160M4 The input of the second source follower 1042 (i.e., the gate of the transistor 160M3) may be controlled by the control signal SENS_SH_EN_E. The output terminal (i.e., node N8) of the second source follower 1042 may be controlled by the control signal SENS_SH_EN_O.

In some embodiments, the output voltage VOUT may be sent to an external pad that may have a heavy load. It may take some settle time for the first source follower 1041 or the second source follower 1042 to sample the voltage at node N6. It may also take some settle time to send the output voltage VOUT to the external pad due to the heavy load.

The first source follower 1041 and the second source follower 1042 may sample the voltage at node N6 and output the previously sampled voltage in an alternating fashion. In some embodiment, when SENS_SH_EN_O=1 and SENS_SH_EN_E=0, the switch transistor 160S2 is closed, and the switch transistor 160S4 is opened. The first source follower 1041 may be used to sample the voltage at node N6, and the second source follower 1042 may be used to output the previously sampled voltage as the output voltage VOUT.

When SENS_SH_EN_O=0 and SENS_SH_EN_E=1, the switch transistor 160S3 is closed, and the switch S5 is opened. The second source follower 1042 may be used to sample the voltage at node N6, and the first source follower 1041 may be used to output the previously sampled voltage as the output voltage VOUT.

Referring to FIG. 17, in some embodiments, the control circuit may assert the control signals 1022G1 to 1022GN one by one in sequence, such as from the control signal 1022G1 (i.e., in the right most pixel electrode circuit) to the control signal 1022GN in sequence, but the present disclosure is not limited thereto.

When the position selection signal PSEL is in the low logic state (i.e., logic 0) and the temperature selection signal TSEL is in the high logic state (i.e., logic 1), the transistor MNB1 in each pixel circuit 1060 is turned off, and the transistor MT2 in each pixel circuit 1060 is turned on, and the AM-EWOD driving system 1600 will enter the position detection mode.

When the AM-EWOD driving system 1600 has entered the position detection mode, the sampling operation and the output operation may be pipelined using the first source follower 1041 and the second source follower 1042.

Referring to FIGS. 16 and 17, upon entering the position detection mode, the control signal 1022G1 is asserted at time t1. At time t1, the pixel circuit 1060 controlled by the control signal 1022G1 is activated, and the transistor 1022 in the activated pixel circuit 1060 controlled by the control signal 1022G1 is turned on. In such a condition, the control signal SENS_SH_EN_O is in the high logic state, and the control signal SENS_SH_EN_E is in the low logic state. The first source follower 1041 may be used to sample the voltage at node N6, and the second source follower 1042 may be used to output the previously sampled voltage as the output voltage VOUT.

The voltage VRS shown in FIG. 17 may refer to the voltage at node N7 of the first source follower 1041 or node N8 of the second source follower 1042. It may take some settle time to fully sample the voltage at node N6, and the voltage VRS may gradually increase to the voltage at node N6 after some settle time, as shown in FIG. 17. It should be noted that the output voltage VOUT output by the second source follower 1042 may be valid during the interval T1 between times t1 and t2 because the first sensor data of the voltage at node N6 is not sampled yet. That is, the previously sample voltage for the second source follower 1042 is not available in such a condition. Thus, the output voltage VOUT during the interval T1 will be ignored.

At time t2, the control signal 1022G1 is de-asserted, and the control signal 1022G2 is asserted. Thus, the transistor 1022 in the activated pixel circuit 1060 controlled by the control signal 1022G2 is turned on, and the control signal SENS_SH_EN_O is in the low logic state, and the control signal SENS_SH_EN_E is in the high logic state. In such a condition, the second source follower 1042 may be used to sample the voltage at node N6, and the first source follower 1041 may be used to output the previously sampled voltage as the output voltage VOUT, which is shown by the sensor signal GateT1SS in FIG. 17. Here, GateT1SS denotes the sensor signal (i.e., sampled voltage) of 1022G1-controlled pixel circuit 1060, and GateT2SS denotes the sensor signal of 1022G2-controlled pixel circuit 1060, and so on. For brevity, the voltage VRS at node N8 of the second source follower 1042 is not shown in FIG. 17.

Similarly, at time t3, the control signal GateT3 is asserted, and the control signal GateT2 is de-asserted. Thus, the transistor 1022 in the activated pixel circuit 1060 controlled by the control signal 1022G3 is turned on, and the control signal SENS_SH_EN_O is in the high logic state, and the control signal SENS_SH_EN_E is in the low logic state. In such a condition, the first source follower 1041 may be used to sample the voltage at node N6, and the second source follower 1042 may be used to output the previously sampled voltage as the output voltage VOUT, which is shown by the sensor signal GateT2SS in FIG. 17. In the subsequent clock cycles, the operations of the AM-EWOD driving system 1600 can be performed in a similar manner. It should be noted that the AM-EWOD driving system 1400 in FIG. 14 and the AM-EWOD driving system 1600 in FIG. 16 can be integrated into an AM-EWOD system equipped with the position detection circuit 1030 and the temperature detection circuit 1040.

Figure 18:
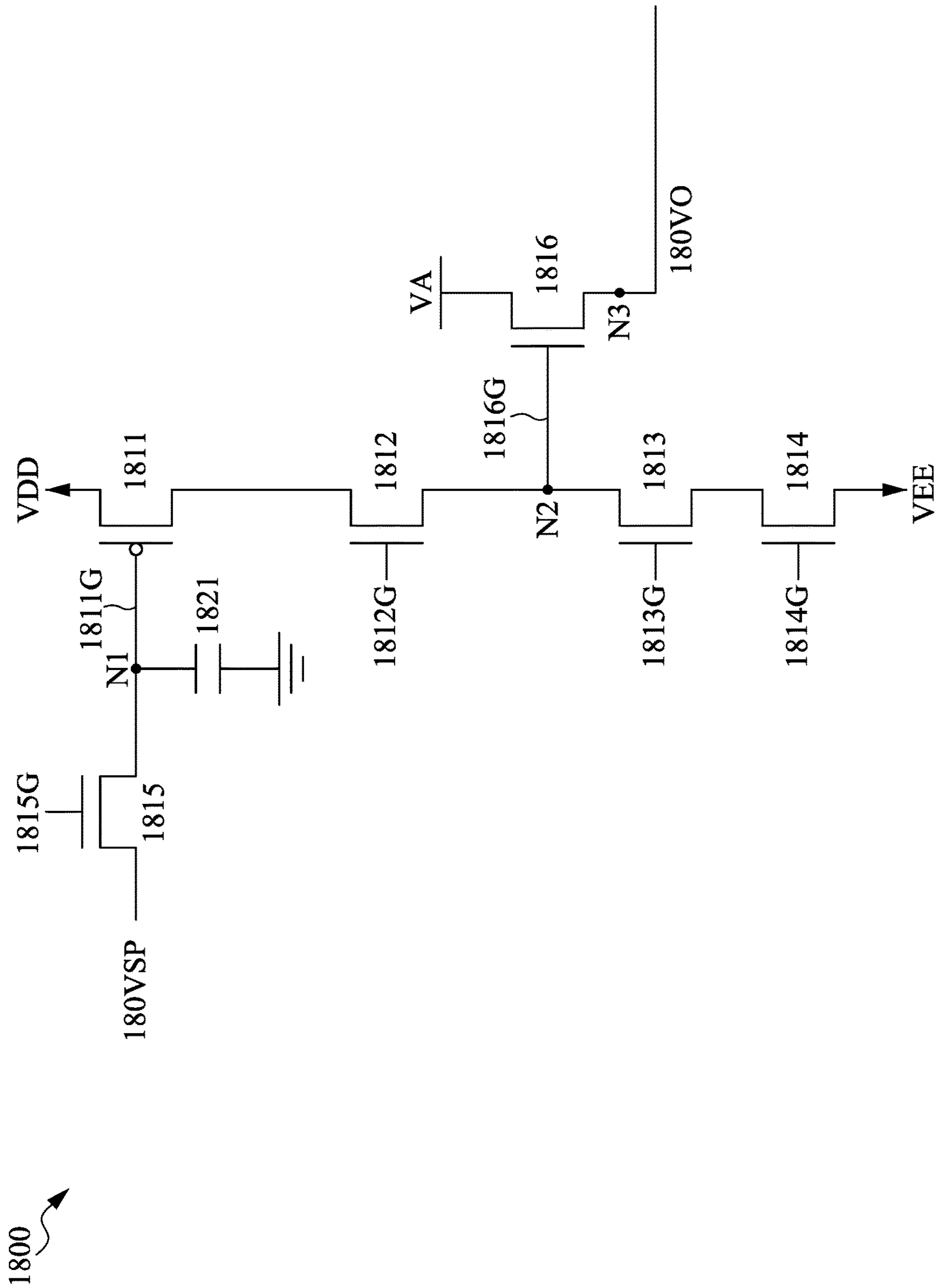
FIG. 18 is a schematic diagram of a pixel electrode circuit 1800 in accordance with yet another embodiment of the present disclosure.

FIG. 18 is a schematic diagram of a pixel electrode circuit 1800 in accordance with yet another embodiment of the present disclosure.

The design concept of the pixel electrode circuit 1800 may ensure that the voltage 180VO at the output terminal of the pixel electrode circuit 1800 can have enough voltage swing range and all transistors in the pixel electrode circuit 1800 do not suffer wide voltage swing range.

Referring to FIG. 18, the pixel electrode circuit 1800 may include transistors 1811, 1812, 1813, 1814, 1815, 1816, and a capacitor 1821. Bias voltages 1812G, 1813G, 1814G are respectively applied to transistors 1812, 1813 and 1814 and turn on the transistors 1812, 1813, 1814.

In one embodiment, the transistor 1811 is P-type transistor, and the transistors 1812, 1813, 1814, 1815, and 1816 are N-type transistors.

The voltage VA may refer to a common mode voltage of the voltage 180VO. In some embodiments, the voltage VA may be 0V. It should be noted that if the common mode voltage of the voltage 180VO is not equal to VA, a voltage may be applied to the dielectric layer 120 of the AM-EWOD system 100 shown in FIG. 1A, resulting in polarization of the dielectric layer 120.

Referring to FIG. 18, in one embodiment, the threshold voltage of the transistor 1812 is Vth. In one embodiment, when the voltage 1811G at node N1 is in the low logic state, the transistor 1811 is turned on, and the voltage at node N2 refers to 1816G. Thus, the voltage difference between the voltages 1816G and VA may be large enough to turn on the transistor 1816, and thus the voltage 180VO at the output terminal (i.e., node N3) of the pixel electrode circuit 1800 will be pulled down to the voltage VA.

In one embodiment, when the voltage VS at node N1 is in the high logic state, the transistor 1811 is turned off, and the voltage 1816G at node N2 will be pulled down to the power supply voltage VEE. Thus, the transistor 1816 is turned off, and the output terminal (i.e., node N3) of the pixel electrode circuit 1800 may be floating. In this way, the voltage swing range of the voltage 180VO at node N3 may follow the voltage signal VAC of the top plate electrode 110 of the AM-EWOD system 100 shown in FIG. 1A, which is between VA−VEE and VA+VEE. Thus, the voltage 180VO may have a wide voltage swing range. In addition, the voltage swing range of the transistor 1816 may be between 0 and VDD, and it indicates that the transistor 1815 does not need to suffer from the wide swing range of the voltage 180VO.

Figure 19:
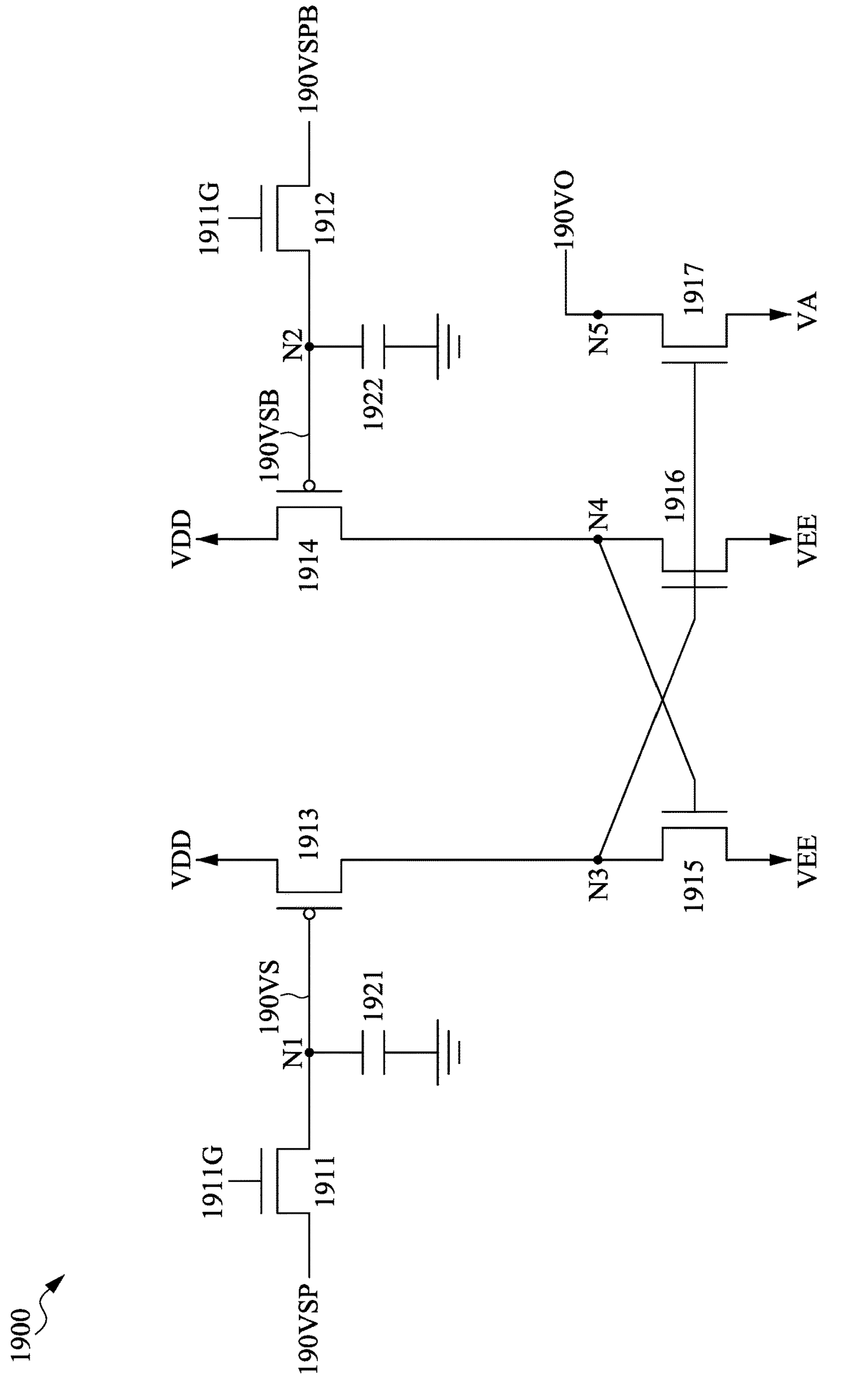
FIG. 19 is a schematic diagram of a pixel electrode circuit 1900 in accordance with yet another embodiment of the present disclosure.

FIG. 19 is a schematic diagram of a pixel electrode circuit 1900 in accordance with yet another embodiment of the present disclosure.

The pixel electrode circuit 1900 may be a latch-type EWOD driving circuit, which includes transistors 1911, 1912, 1913, 1914, 1915, 1916 and 1917, and capacitors 1921 and 1922.

The transistors 1915 and 1916 may form a latch. In one embodiment, the gate of the transistor 1916 may be electrically connected to the drain of the transistor 1915 (i.e., node N3), and the drain of the transistor 1916 may be electrically connected to the gate of the transistor 1915. In addition, the gate of the transistor 1917 may be electrically connected to node N3. It should be noted that the transistor 1917 is driven by the gate voltage of the transistor 1916.

In one embodiment, the input voltages 190VSP and 190VSPB refer to complementary input voltages. While input voltage 190VSP is logic 0, the input voltage 190VSPB is logic 1. While input voltage 190VSP is logic 1, the input voltage 190VSPB is logic 0. The voltage VS at node N1 and the voltage 190VSB at node N2 may be differential signals.

In some embodiments, the input voltages 190VSP and 190VSPB may be from different source driver ICs (not shown in FIG. 19) external to the pixel electrode circuit 1900. Therefore, the transistors 1915-1916 and the transistors 1913-1914 have a voltage swing range between VDD and VEE. In one embodiment, the input voltage 190VSP is in the low logic state and the input voltage 190VSPB is in the high logic state. The voltage 190VS at node N1 is in the low logic state, and the voltage 190VSB at node N2 is in the high logic state. Thus, the transistor 1913 is turned on, and the transistor 1914 is turned off. In such a condition, the drain (i.e., node N3) of the transistor 1915 is pulled up to the power supply voltage VDD, and the voltage at node N3 will turn on the transistor 1917, and the voltage 190VO at the output terminal (i.e., node N5) of the pixel electrode circuit 1900 will be pulled (i.e., up or down) to the voltage VA.

In one embodiment, the input voltage 190VSP is in the high logic state and, and the input voltage 190VSPB is in the low logic state. In the meanwhile, the voltage 190VS at node N1 is in the high logic state, and the voltage 190VSB at node N2 is in the low logic state. In such a condition, the transistor 1913 is turned off, and the transistor 1914 is turned on. The drain (i.e., node N3) of the transistor 1915 may be floating, and the transistor 1917 is turned off. The voltage 190VO at the output terminal (i.e., node N5) of the pixel electrode circuit 1900 may be coupled to the voltage signal VAC of the top plate electrode 110 the AM-EWOD system 100 of FIG. 1. The voltage 190VO may have a voltage swing range between VA-VEE and VEE. In other words, the peak to peak value of the voltage swing range of the voltage Vtop is (VA−2*VEE). Therefore, the transistors 1915-1916, 1913-1914, and 1917 may suffer the voltage swing range of VDD-VEE, but they can allow a wider voltage swing range of (VA−2*VEE).

Figure 20:
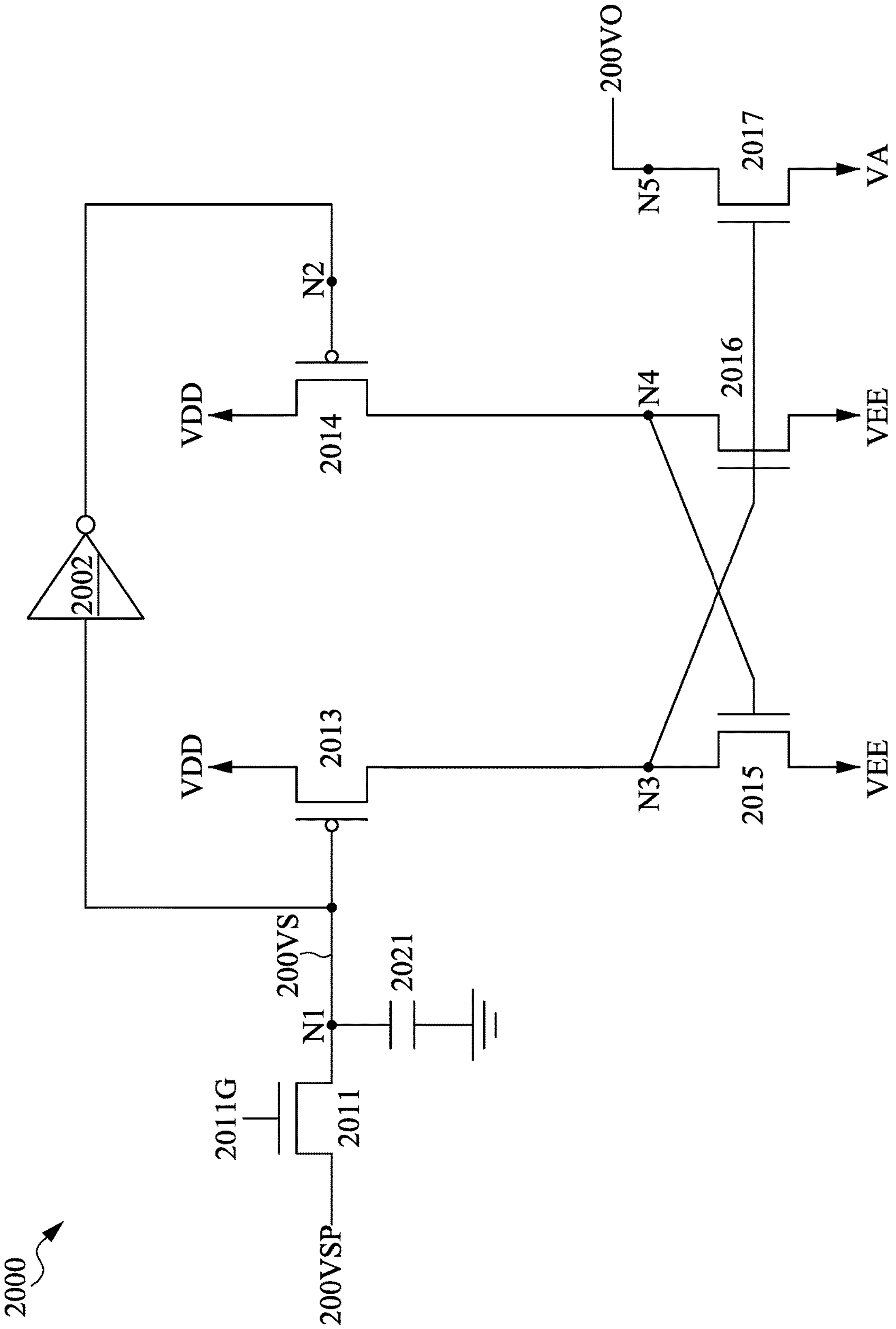
FIG. 20 is a schematic diagram of a pixel electrode circuit 2000 in accordance with yet another embodiment of the present disclosure.

FIG. 20 is a schematic diagram of a pixel electrode circuit 2000 in accordance with yet another embodiment of the present disclosure.

The pixel electrode circuit 2000 shown in FIG. 20 may be similar to the pixel electrode circuit 1900 shown in FIG. 19. Referring to FIG. 20, the input to the gate of the transistor 2014 is from an inverter 2002. The inverter 2002 is coupled between the gates of the transistors 2013 and 2014. Due to the inverter 2002, the input voltages to the gates of the transistors 2013 and 2014 are complementary. The operations of the transistors in the pixel electrode circuit 2000 may be similar to those in the pixel electrode circuit 1900, and thus will not be repeated here. In addition, in comparison with the pixel electrode circuit 1900 in FIG. 19, the pixel electrode circuit 2000 in FIG. 20 may need one external source driver IC and an extra inverter disposed therein. However, the design cost of the pixel electrode circuit 2000 can still be reduced in comparison with the pixel electrode circuit 1900.

Figure 21:
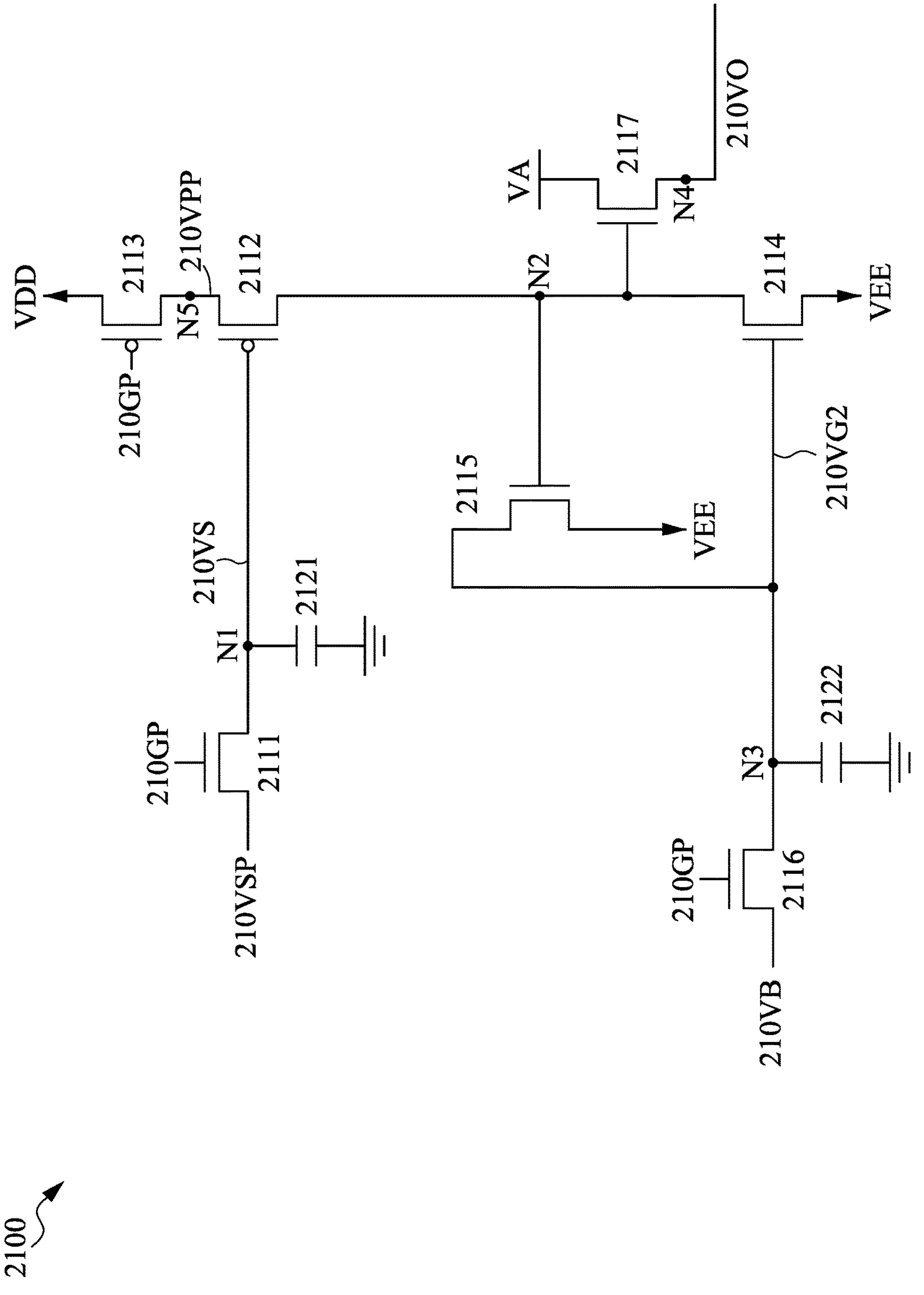
FIG. 21 is a schematic diagram of a pixel electrode circuit 2100 in accordance with yet another embodiment of the present disclosure.

FIG. 21 is a schematic diagram of a pixel electrode circuit 2100 in accordance with yet another embodiment of the present disclosure.

Referring to FIG. 21, the pixel electrode circuit 2100 may include transistors 2111, 2112, 2113, 2114, 2115, 2116 and 2117, and capacitors 2121 and 2122.

For the input voltage 210VSP, the high logic state (i.e., logic 1) may be the power supply voltage VDD, and the low logic state (i.e., logic 0) may be 0V. The transistors 2111, 2113 and 2116 may be controlled by the control signal 210GP. When the control signal 210GP is in the high logic state, the transistors 2111 and 2116 are turned on, and the transistor 2113 is turned off. The voltage 210VS at node N1 may be charged to the input voltage 210VSP through the capacitor 210CSTP. The voltage 210VG2 at node N3 may be charged to the bias voltage 210VB through the capacitor 210CSTP2. When the transistor 2113 is turned off, the transistor 2112 will be turned off no matter how the voltage VS at node N1 is. The transistor 2114 is turned on to pull down the voltage at node N2 to the power supply voltage VEE if VB>>VEE. The transistor 2115 will be turned off since the voltage at node N2 has been pulled down to the power supply voltage VEE. In this case, the transistor 2117 is turned off, and the output terminal (i.e., node N4) of the pixel electrode circuit 2100 may be floating, and the voltage 210VO at node N4 may follow the voltage signal VAC of the top plate electrode 110 of the AM-EWOD system 100 of FIG. 1.

When the control signal 210GP is switched to the low logic state, the transistors 2111 and 2116 are turned off, and the transistor 2113 is turned on. Thus, the voltage 210VPP at node N5 will be pulled up to the power supply voltage VDD. If the voltage 210VS at node N1 is already charged to the power supply voltage VDD, the transistor 2112 will be turned off when the voltage 210VG2 at node N3 is already charged to the bias voltage 210VB. Thus, the transistor 2114 is turned on to pull down the voltage at node N1 to the power supply voltage VEE, and the transistor 2117 is turned off, so the output terminal (i.e., node N4) of the pixel electrode circuit 2100 may be floating, and the lower limit of the voltage swing range of the voltage 210VO may be VEE.

If the voltage 210VS at node N1 is 0V (i.e., capacitor 2121 is not charged), the transistor 2112 is turned on. The voltage at node N2 will be pull up to the power supply voltage VDD. The transistor 2112 will compete with the transistor 2114 while the transistor 2114 is trying to pull down the voltage at node N2 to the power supply voltage VEE. If the pulling-up force of transistor 2112 is stronger than pulling-down force the transistor 2114, the voltage at node N2 will be pulled up to the power supply voltage VDD. The transistor 2115 is turned on to pull down the voltage 210VG2 at node N3 to the power supply voltage VEE. Then, the transistor 2114 will be turned off. The voltage at node N2 will be pulled up to a voltage higher than the power supply voltage VDD, so the transistor 2117 is turned on to pull up the voltage 210VO at node N4 to the voltage VA. Therefore, the voltage swing range of the voltage Vtop at node N4 may be 2*(VA−VEE).

Figure 22:
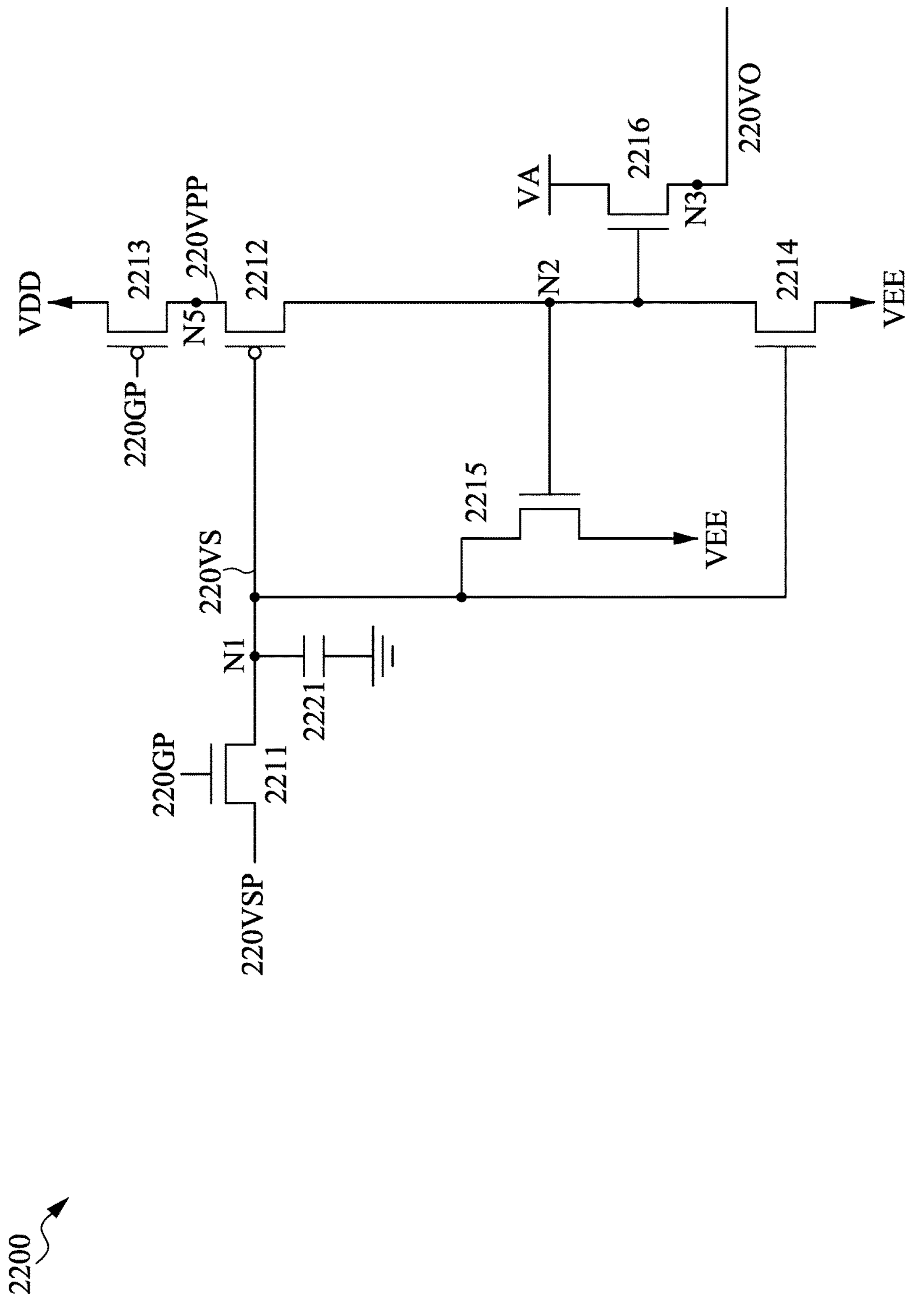
FIG. 22 is a schematic diagram of a pixel electrode circuit 2200 in accordance with yet another embodiment of the present disclosure.

FIG. 22 is a schematic diagram of a pixel electrode circuit 2200 in accordance with yet another embodiment of the present disclosure.

In yet another embodiment, the pixel electrode circuit 2200 may include transistors 2211, 2212, 2213, 2214, 2215 and 2216, and a capacitor 2221. The number of transistors and that of capacitors in the pixel electrode circuit 2200 shown in FIG. 22 are less than that in the pixel electrode circuit 2100 shown in FIG. 21.

When the control signal 220GP is in the high logic state, the transistor 2213 is turned off, and the transistor 2211 is turned on. The voltage 220VS at node N1 will be charged to the input voltage 220VSP, which may be equal to the power supply voltage VDD or 0V. When the input voltage 220VSP=VDD, the voltage 220VS will be charged to the power supply voltage VDD. The transistor 2214 is turned on. The voltage at node N2 is pulled down to the power supply voltage VEE. The transistor 2214 is turned off. The output terminal (i.e., node N3) of the pixel electrode circuit 2200 will be floating.

When the control signal 220GP is switched to the low logic state, the voltage 220VS at node N1 is already charged to the power supply voltage VDD. The transistor 2212 will be turned off, and the transistor 2214 is turned on to keep pulling the voltage at node N1 to the power supply voltage VEE. Therefore, the output terminal (i.e., node N3) of the pixel electrode circuit 2200 will be floating.

When the control signal 220GP is in the low logic state and the input voltage VSP=0V, the voltage VS will be 0V, and the transistors 2212 and 2213 are turned on. The voltage at node N2 will be pulled high to the power supply voltage VDD. However, the transistor 2212 may have to compete with the transistor 2214 which is trying to pull down the voltage at node N2 to the power supply voltage VEE.

The threshold voltage of the transistor 2215 refers to Vth. If the voltage at node N1 is higher than (VEE+Vth), the voltage 220VS will be pulled down to the power supply voltage VEE. During this process, the pulling-up force of the transistor 2212 will increase because the voltage 220VS will decrease. Since the voltage 220VS will decrease, the pulling-down force of the transistor 2214 will decrease. This is positive feedback to increase the force to pull up the voltage at node N1 to the power supply voltage VDD. Therefore, the transistor 2216 will be turned on. The output terminal 220VO at node N3 of the pixel electrode circuit 2200 will be pulled to the voltage VA.

Figure 23:
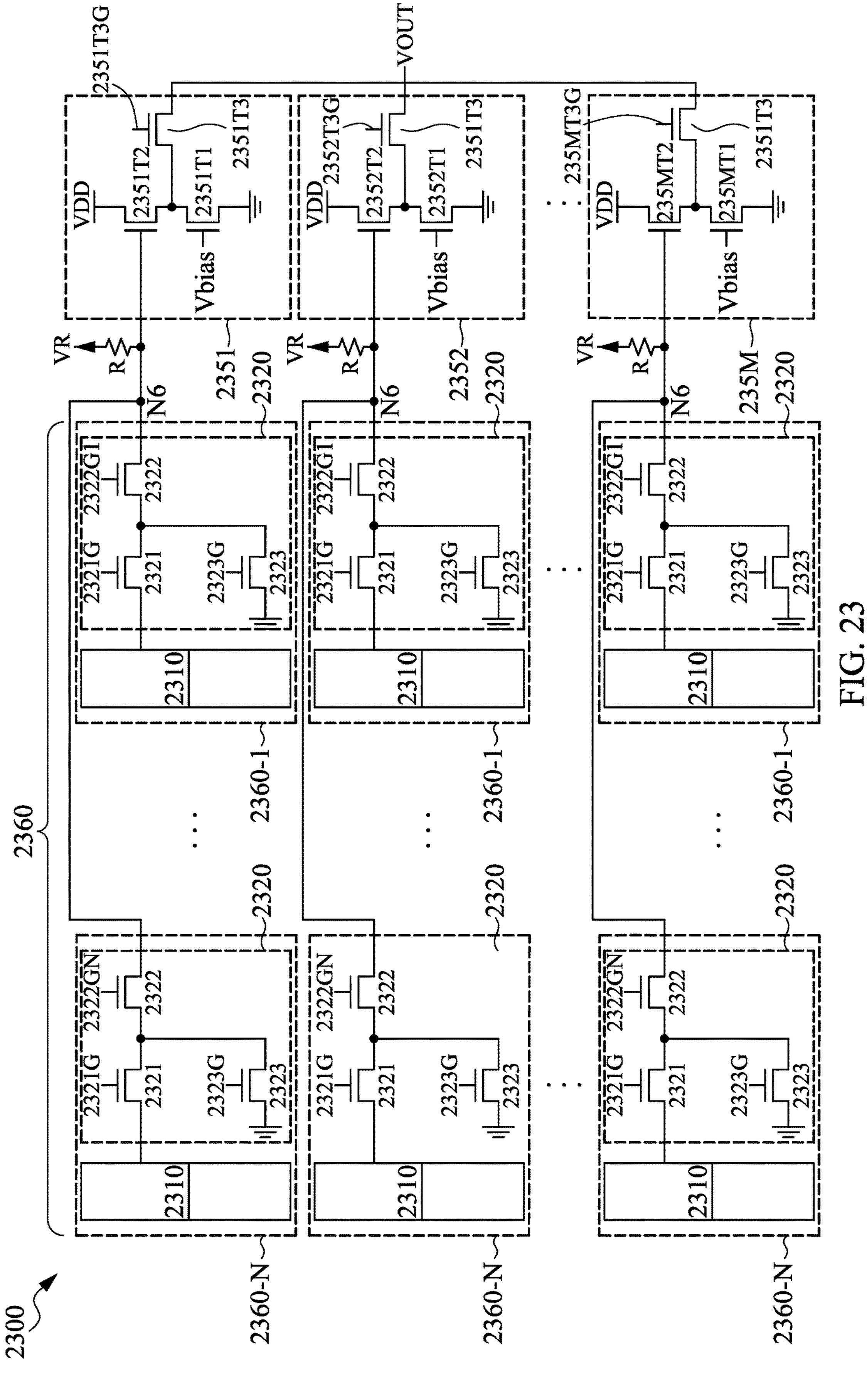
FIG. 23 is a schematic diagram of an AM-EWOD driving system 2300 in accordance with another embodiment of the present disclosure

FIG. 23 is a schematic diagram of an AM-EWOD driving system 2300 in accordance with another embodiment of the present disclosure.

In the embodiment of FIG. 14, the pixel circuits 1060 may be arranged in a row, and they share the same position detection circuit 1030. The technique described in the embodiment of FIG. 14 can be also applied to the pixel circuits 2360 arranged in a two-dimensional array which includes M rows*N columns, as shown in FIG. 23. The pixel circuits 2360 (e.g., 2360-1 to 2360-N) in each of the rows may share the same source follower. For example, the pixel circuits 2360-1 to 2360-N in the first row may share the source follower 2351, and the output terminal of transistor 2322 in each of the pixel circuits 2360-1 to 2360-N in the first row is connected to node N6 in the first row. The pixel circuits 2360-1 to 2360-N in the second row may share the source follower 2352, and the output terminal of transistor 2322 in each of the pixel circuits 2360-1 to 2360-N in the second row is connected to node N6 in the second row. The pixel circuits 2360-1 to 2360-N in other rows can be arranged in a similar manner.

In addition, there are N pixel circuits 2360 (e.g., 2360-1 to 2360-N) in the same row, and each of the pixel circuits 2360 may include a pixel electrode circuit 2310 and a detection control circuit 2320 which are similar to the pixel electrode circuit and detection control circuit described in the aforementioned embodiments, the details of which are not repeated here. The detection control circuit 2320 in each of the pixel circuits 2360, including pixel circuits 2360-1, 2360-1, . . . , 2360-N, in the same row may be controlled by a respective control signal 2322G1, 2322G2, . . . , 2322GN, and the control signals 2322G1 to 2322GN are activated one by one in sequence.

Taking the source follower 2351 as an example. The source follower 2351 may include two transistors 2351T1, 2351T2 and 2351T3, wherein the transistor 2351T3 may be a switch controlled by a selection signal 2351T3G. When the selection signal 2351T3G is asserted, the source follower 2351 may output the sampled voltage at node N6 as an output voltage VOUT. In addition, a microcontroller unit (MCU) may be used to control the function and speed of the source followers 2351 to 235M. With the assist of the MCU, sub-sampling on the pixel circuits 2360 can be performed to reduce overall sensing time.

It should be noted that the pixel circuits 2360 in the two-dimensional array shown in FIG. 23 may be activated one by one in a predetermined order, such as raster scan. In other words, a specific pixel circuit 2360 in the two-dimensional array is activated at one time, which indicates that the row on which the specific pixel circuit 2360 is located is activated, and the control signal (i.e., e.g., one of the control signals 2322G1 to 2322GN) corresponding to the specific pixel circuit 2360 is asserted. The selection signal corresponding to the activated row is also asserted to output the sampled voltage at node N6 on the activated row as the output voltage VOUT. In addition, an analog-to-digital converter (ADC) may be disposed outside the AM-EWOD driving system 2300 to convert the output voltage VOUT into a digital number.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An apparatus, comprising:

a pixel electrode circuit, comprising:

a first switch, controlled by a first control signal, the first switch comprising a first terminal electrically connected to an input voltage, and a second terminal electrically connected to a first node;

a cascode inverter stage, coupled between the first node and a second node;

a first transistor, having a gate electrically connected to a third node, a first terminal connected to a fourth node, and a second terminal connected to a fifth node, the first transistor being a first-type transistor;

a second transistor, having a gate electrically connected to the second node, a first terminal being grounded, and a second terminal connected to the fourth node, the second transistor being a second-type transistor; and a first capacitor and a second capacitor, wherein the first capacitor is coupled between the first node and a ground, and the fifth node is coupled to an alternating-current (AC) voltage through the second capacitor.

2. The apparatus of claim 1, wherein the first-type transistor is a P-type transistor, and the second-type transistor is an N-type transistor.

3. The apparatus of claim 1, wherein the cascode inverter stage comprises:

a first inverter, having an input terminal connected to the first node, and an output terminal connected to the third node; and a second inverter, having an input terminal connected to the third node, and an output terminal connected to the second node.

4. The apparatus of claim 3, wherein the first inverter and the second inverter are supplied with a first power supply voltage and a second power supply voltage.

5. The apparatus of claim 4, wherein the first power supply voltage is a positive power supply voltage, and the second power supply voltage is a negative power supply voltage.

6. The apparatus of claim 5, wherein when the pixel electrode circuit enters a pull-down mode, the input voltage is equal to the first power supply voltage, a first voltage at the third node is equal to the second power supply voltage, and a second voltage at the second node is equal to the first power supply voltage, wherein the first transistor and the second transistor are turned on, and an output voltage at the fifth node is pulled down to the ground.

7. The apparatus of claim 5, wherein when the pixel electrode circuit enters a floating mode, the input voltage is equal to the second power supply voltage, a first voltage at the third node is equal to the first power supply voltage, and a second voltage at the second node is equal to the second power supply voltage, wherein an output voltage at the fifth node follows the AC voltage through the second capacitor.

8. The apparatus of claim 7, wherein when the output voltage at the fifth node is positive, the first transistor is turned on, and the second transistor is turned off, the fifth node is floating, and the output voltage at the fifth node follows the AC voltage through the second capacitor.

9. The apparatus of claim 7, wherein when the output voltage at the fifth node is negative, the first transistor is turned off, the fifth node is floating, and the output voltage at the fifth node follows the AC voltage through the second capacitor.

10. An apparatus, comprising:

a pixel electrode circuit, comprising:

a first switch, controlled by a first control signal, the first switch comprising a first terminal electrically connected to an input voltage, and a second terminal electrically connected to a first node;

an inverter, coupled between the first node and a second node;

a first transistor, having a gate electrically connected to the second node, a first terminal connected to a fourth node, and a second terminal connected to a fifth node, the first transistor being a first-type transistor;

a second transistor, having a gate electrically connected to the first node, a first terminal being grounded, and a second terminal connected to the fourth node, the second transistor being a second-type transistor; and a first capacitor and a second capacitor, wherein the first capacitor is coupled between the first node and a ground, and the fifth node is coupled to an alternating-current (AC) voltage through the second capacitor.

11. The apparatus of claim 10, wherein the first transistor is a P-type transistor, and the second transistor is an N-type transistor.

12. The apparatus of claim 10, wherein the inverter is supplied with a first power supply voltage and a second power supply voltage.

13. The apparatus of claim 12, wherein the first power supply voltage is a positive power supply voltage, and the second power supply voltage is a negative power supply voltage.

14. The apparatus of claim 13, wherein when the pixel electrode circuit enters a pull-down mode, the input voltage is equal to the first power supply voltage, and a first voltage at the first node is equal to the first power supply voltage, and a second voltage at the second node is equal to the second power supply voltage.

15. The apparatus of claim 14, wherein the first transistor and the second transistor are turned on, and an output voltage at the fifth node is pulled down to the ground.

16. The apparatus of claim 13, when the pixel electrode circuit enters a floating mode, the input voltage is equal to the second power supply voltage, and a first voltage at the first node is equal to the second power supply voltage, and a second voltage at the second node is equal to the first power supply voltage, wherein an output voltage at the fifth node follows the AC voltage through the second capacitor.

17. The apparatus of claim 16, wherein when the output voltage at the fifth node is positive, the first transistor is turned on, and the second transistor is turned off, the fifth node is floating, and the output voltage at the fifth node follows the AC voltage through the second capacitor.

18. The apparatus of claim 16, wherein when the output voltage at the fifth node is negative, the first transistor is turned off, the fifth node is floating, and the output voltage at the fifth node follows the AC voltage through the second capacitor.

* * * * *